United States Patent
Suzuki et al.

(10) Patent No.: US 6,452,687 B1
(45) Date of Patent: Sep. 17, 2002

(54) COLOR IMAGE FORMING APPARATUS AND SCANNING OPTICAL APPARATUS

(75) Inventors: Yasuo Suzuki, Numazu; Shin Komori, Gotenba; Manabu Kato, Kawasaki; Junya Azami, Shizuoka-ken, all of (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/266,826

(22) Filed: Mar. 12, 1999

(30) Foreign Application Priority Data

Mar. 16, 1998 (JP) .......................................... 10-085010
May 15, 1998 (JP) .......................................... 10-152006

(51) Int. Cl.$^7$ .............................. G06F 15/00; G06K 1/00
(52) U.S. Cl. ........................ 358/1.1; 358/1.7; 358/474; 347/116; 359/210; 359/206
(58) Field of Search ................................. 358/501, 474, 358/505, 1.1, 1.7; 347/116, 242, 244, 256, 258; 359/17, 19, 209, 558, 566, 206, 210; 355/52; 250/236

(56) References Cited

U.S. PATENT DOCUMENTS

| | | |
|---|---|---|
| 5,212,501 A | 5/1993 | Nakamura et al. .......... 347/259 |
| 5,315,427 A | 5/1994 | Rauch et al. ................. 359/216 |
| 5,422,753 A | 6/1995 | Harris .......................... 359/216 |
| 5,486,694 A | 1/1996 | Harris .......................... 250/236 |
| 5,680,253 A * | 10/1997 | Hasegawa et al. ........... 359/566 |
| 5,838,480 A * | 11/1998 | McIntyre et al. .............. 359/17 |
| 6,339,490 B1 * | 1/2002 | Hsu et al. ..................... 359/210 |

FOREIGN PATENT DOCUMENTS

| | | |
|---|---|---|
| EP | 0 814 596 | 12/1997 |
| EP | 0 827 004 | 3/1998 |
| EP | 0 961 137 | 12/1999 |
| EP | 1 035 730 | 9/2000 |

\* cited by examiner

*Primary Examiner*—Kimberly A. Williams
(74) *Attorney, Agent, or Firm*—Fitzpatrick, Cella, Harper & Scinto

(57) ABSTRACT

A scanning optical device has a light source, a deflector for deflecting light emitted from the light source, and an optical system for guiding the light emitted from the light source onto a surface to be scanned. The scanning optical device incorporates a mechanism for displacing a refraction section or/and a diffraction section of the optical system.

A color image forming apparatus incorporates the scanning optical devices and image carrying members corresponding thereto.

33 Claims, 15 Drawing Sheets

COLOR IMAGE FORMING APPARATUS AND SCANNING OPTICAL APPARATUS

BACKGROUND OF THE INVENTION

1. Field of the Invention

The present invention relates to a color image forming apparatus and a scanning optical apparatus and, more particularly, to those arranged to record color image information or the like with suppressing scanning line deviation among colors and with suppressing asymmetric magnification (component of slope of magnification) (image height deviation), for example, such as those suitably applicable to such apparatus as laser beam printers, color digital copiers, etc. having the color electrophotographic process.

2. Related Background Art

In the conventional scanning optical apparatus used in the laser beam printers (LBPs), digital copiers, and so on, light emitted from light source means while optically being modulated according to an image signal is deflected periodically by an optical deflector, for example, by a rotary polygon mirror (polygon mirror), and a scanning optical element (imaging element) having the fθ characteristics focuses the deflected light in a spot shape on a surface of a photosensitive recording medium (photosensitive drum) so as to optically scan the surface, thereby carrying out image recording.

FIG. 1 is a schematic diagram to show the main part of a conventional scanning optical apparatus of this type.

In the same figure divergent light emitted from light source means 91 is collimated into a nearly parallel beam by collimator lens 92 and the beam (amount of light) is limited by stop 93 to enter a cylinder lens (cylindrical lens) 94 having a predetermined refractive power only in the sub-scanning direction. The nearly parallel beam incident to the cylinder lens 94 is emergent in the state of the nearly parallel beam in the main scanning cross section as it is. In the sub-scanning cross section the beam is converged to be focused as an almost line image on a deflection surface (reflective surface) 95a of an optical deflector 95 comprised of the rotary polygon mirror (polygon mirror).

The beam deflected and reflected by the deflection surface 95a of the optical deflector 95 is guided through a scanning optical element (fθ lens) 96 having the fθ characteristics onto a photosensitive drum surface 98 as a surface to be scanned and the photosensitive drum surface 98 is optically scanned with the beam in the direction of arrow F by rotating the optical deflector 95 in the direction of arrow E. This effects image recording on the photosensitive drum surface 98 which is a recording medium.

FIG. 2 is a schematic diagram to show the main part of a color image forming apparatus for forming a color image by simultaneously using a plurality of such scanning optical devices described above to record image information of colors on respective photosensitive drum surfaces different from each other.

In the same figure numerals 111, 112, 113, 114 each denote the scanning optical devices, 131, 132, 133, 134 each the photosensitive drums as image carrying members, 121, 122, 123, 124 each developing units, and 141 a conveying belt. The color image forming apparatus illustrated in FIG. 2 has the four scanning optical devices described above (111, 112, 113, 114), which correspond to the colors C (cyan), M (magenta), Y (yellow), and B (black) respectively, and the apparatus is arranged to record image signals on the respective surfaces of the photosensitive drums 131, 132, 133, 134 in tandem, thereby printing the color image at high speed.

Since the color image forming apparatus of this type forms the image by superposition of plural scanning lines, it is particularly important to reduce the scanning line deviation (which will also be referred to as "registration deviation") among the colors.

A method for regulating (correcting) this scanning line deviation is, for example, a method for forming registration detection images of the respective colors (cyan, magenta, yellow, and black) on a transfer medium accurately conveyed on the transfer belt, detecting positions of the respective registration detection images by a detecting device, and electrically regulating the deviation, based on the signals thus detected.

There was, however, a problem that it was very difficult to electrically regulate this scanning line deviation and it cost high in terms of the cost.

Further, there was another problem that it was very difficult in the color image forming apparatus of this type to correct the asymmetric magnification (component of slope of magnification) (image height deviation) in the main scanning direction on the surfaces of the image carrying members by simple structure.

SUMMARY OF THE INVENTION

An object of the present invention is to provide a compact color image forming apparatus suitable for high-resolution printing, the color image forming apparatus having a plurality of scanning optical devices, wherein slant deviation of a scanning line and curving of a scanning line in each scanning optical device is adjusted by displacing a diffracting optical element of a diffraction section of each scanning optical device whereby the registration deviation in the sub-scanning direction among the colors can be suppressed by the simple structure and wherein the asymmetric magnification (component of slope of magnification) in the main scanning direction on the surface of the image carrying member in each scanning optical device is adjusted by displacing a refraction section or a scanning section comprising the refraction section and a deflecting element or/and the diffraction section in each scanning optical device in the main scanning direction whereby the image height deviation can be suppressed by the simple structure, and also to provide the scanning optical device.

A color image forming apparatus of the present invention is a color image forming apparatus comprising plural sets of a scanning optical device and an image carrying member corresponding thereto, said scanning optical device having an imaging system comprising a refraction section having at least one refracting optical element and a diffraction section having at least one diffracting optical element, the color image forming apparatus being arranged to guide light emitted from each scanning optical device onto a surface of each corresponding image carrying member, to scan the surfaces of the image carrying members with the respective beams, to form images of different colors on the surfaces of the respective image carrying members, and to form a color image from the images formed on the surfaces of the plural image carrying members, wherein each of the plurality of scanning optical devices is arranged in such a manner that an irradiation position of the light on the surface of the image carrying member is adjusted by displacing the diffracting optical element.

Particularly, the color image forming apparatus is characterized:

in that said diffracting optical element is constructed as a separate unit from the other optical elements forming said scanning optical device;

in that a direction of displacement of the diffracting optical element is a direction of rotation about the optical axis or a direction of rotation about an axis along the longitudinal direction of the diffracting optical element and the diffracting optical element is arranged to be rotatable independently in each of these directions;

in that a slant of a scanning line on the surface of said image carrying member is adjusted by rotating said diffracting optical element about the optical axis or within a plane normal to the optical axis;

in that a curve of a scanning line on the surface of said image carrying member is adjusted by rotating said diffracting optical element about the axis along the longitudinal direction of the diffracting optical element;

in that said diffracting optical element is displaced based on a signal from detecting means for detecting registration;

in that said diffracting optical element has a power in the main scanning direction and a power in the sub-scanning direction, said powers being different from each other;

in that said refraction section has a plastic toric lens having a power in the main scanning direction and a power in the sub-scanning direction, said powers being different from each other; and so on.

Another color image forming apparatus of the present invention is a color image forming apparatus comprising plural sets of a scanning optical device and an image carrying member corresponding thereto, said color image forming apparatus being arranged to guide light emitted from each scanning optical device onto a surface of each corresponding image carrying member, to scan the surfaces of the image carrying members with the respective beams, to form images of different colors on the surfaces of the respective image carrying members, and to form a color image from the images formed on the surfaces of the plural image carrying members, each of said plural scanning optical devices comprising:

light source means comprising a semiconductor laser;

a first optical element for converting light emitted from the light source means into a substantially parallel beam;

a second optical element for focusing the substantially parallel beam thus converted, into a line image longitudinal in the main scanning direction on a deflection surface of a deflecting element; and a third optical element comprising a refraction section having at least one refracting optical element and a diffraction section having at least one diffracting optical element for focusing a beam deflected by the deflecting element in a spot shape on the surface of the image carrying member, wherein each of said plural scanning optical devices is arranged in such a manner that an irradiation position of the beam on the surface of the image carrying member is adjusted by displacing the diffracting optical element.

Particularly, the color image forming apparatus is characterized:

in that said diffracting optical element is constructed as a separate unit from the other optical elements forming said scanning optical device;

in that a direction of displacement of the diffracting optical element is a direction of rotation about the optical axis or a direction of rotation about an axis along the longitudinal direction of the diffracting optical element and the diffracting optical element is arranged to be rotatable independently in each of these directions;

in that a slant of a scanning line on the surface of said image carrying member is adjusted by rotating said diffracting optical element about the optical axis or within a plane normal to the optical axis;

in that a curve of a scanning line on the surface of said image carrying member is adjusted by rotating said diffracting optical element about the axis along the longitudinal direction of the diffracting optical element;

in that said diffracting optical element is displaced based on a signal from detecting means for detecting registration;

in that said diffracting optical element has a power in the main scanning direction and a power in the sub-scanning direction, said powers being different from each other;

in that said refraction section has a plastic toric lens having a power in the main scanning direction and a power in the sub-scanning direction, said powers being different from each other; and so on.

A scanning optical device of the present invention is a scanning optical device for scanning a surface to be scanned, using an imaging system comprising a refraction section having at least one refracting optical element and a diffraction section having at least one diffracting optical element, said scanning optical device being arranged in such a manner that an irradiation position of a beam on the surface to be scanned is adjusted by displacing the diffracting optical element.

Particularly, the scanning optical device is characterized:

in that said diffracting optical element is constructed as a separate unit from the other optical elements forming said scanning optical device;

in that a direction of displacement of the diffracting optical element is a direction of rotation about the optical axis or a direction of rotation about an axis along the longitudinal direction of the diffracting optical element and the diffracting optical element is arranged to be rotatable independently in each of these directions;

in that a slant of a scanning line on the surface to be scanned is adjusted by rotating said diffracting optical element about the optical axis or within a plane normal to the optical axis;

in that a curve of a scanning line on the surface to be scanned is adjusted by rotating said diffracting optical element about the axis along the longitudinal direction of the diffracting optical element;

in that said diffracting optical element has a power in the main scanning direction and a power in the sub-scanning direction, said powers being different from each other;

in that said refraction section has a plastic toric lens having a power in the main scanning direction and a power in the sub-scanning direction, said powers being different from each other; and so on.

A further color image forming apparatus of the present invention is a color image forming apparatus comprising plural sets of a scanning optical device and an image carrying member corresponding thereto, said scanning optical device having an imaging system comprising a refraction section having at least one refracting optical element and a diffraction section having at least one diffracting optical element, the color image forming apparatus being arranged to guide light emitted from each scanning optical device onto a surface of each corresponding image carrying member, to scan the surfaces of the image carrying members with the respective beams, to form images of different colors on the surfaces of the respective image carrying members, and to form a color image from the images formed on the surfaces of the plural image carrying members, wherein each of said plural scanning optical devices is arranged in such a manner that asymmetric magnification (component of slope of magnification) in the main scanning direction on the surface of the image carrying member is adjusted by displacing the refraction section or a scanning section comprising the refraction section and a deflecting element or/and the diffraction section in the main scanning direction.

Particularly, the color image forming apparatus is characterized:

in that said diffracting optical element is constructed as a separate unit from the other optical elements forming said scanning optical device;

in that each unit of said refraction section or the scanning section comprising the refraction section and the deflecting element and said diffraction section is fixed to a sheet metal stay;

in that a direction of displacement in the main scanning direction of said refraction section or the scanning section comprising the refraction section and the deflecting element and said diffraction section is a direction parallel to the main scanning direction or a direction of rotation about the optical axis within a plane including the main scanning direction;

in that said diffracting optical element has a power in the main scanning direction and a power in the sub-scanning direction, said powers being different from each other;

in that said refraction section has a plastic toric lens having a power in the main scanning direction and a power in the sub-scanning direction, said powers being different from each other; and so on.

Still another color image forming apparatus of the present invention is a color image forming apparatus comprising plural sets of a scanning optical device and an image carrying member corresponding thereto, said color image forming apparatus being arranged to guide light emitted from each scanning optical device onto a surface of each corresponding image carrying member, to scan the surfaces of the image carrying members with the respective beams, to form images of different colors on the surfaces of the respective image carrying members, and to form a color image from the images formed on the surfaces of the plural image carrying members, each of said plural scanning optical devices comprising:
light source means comprising a semiconductor laser;
a first optical element for converting light emitted from the light source means into a substantially parallel beam;
a second optical element for focusing the substantially parallel beam thus converted, into a line image longitudinal in the main scanning direction on a deflection surface of a deflecting element; and
a third optical element comprising a refraction section having at least one refracting optical element and a diffraction section having at least one diffracting optical element for focusing a beam deflected by the deflecting element in a spot shape on the surface of the image carrying member, wherein each of said plural scanning optical devices is arranged in such a manner that asymmetric magnification (component of slope of magnification) in the main scanning direction on the surface of the image carrying member is adjusted by displacing the refraction section or a scanning section comprising the refraction section and the deflecting element or/and the diffraction section in the main scanning direction.

Particularly, the color image forming apparatus is characterized:

in that said diffracting optical element is constructed as a separate unit from the other optical elements forming said scanning optical device;

in that each unit of said refraction section or the scanning section comprising the refraction section and the deflecting element and said diffraction section is fixed to a sheet metal stay;

in that a direction of displacement in the main scanning direction of said refraction section or the scanning section comprising the refraction section and the deflecting element and said diffraction section is a direction parallel to the main scanning direction or a direction of rotation about the optical axis within a plane including the main scanning direction;

in that said diffracting optical element has a power in the main scanning direction and a power in the sub-scanning direction, said powers being different from each other;

in that said refraction section has a plastic toric lens having a power in the main scanning direction and a power in the sub-scanning direction, said powers being different from each other; and so on.

A further scanning optical device of the present invention is a scanning optical device for scanning a surface to be scanned, using an imaging system comprising a refraction section having at least one refracting optical element and a diffraction section having at least one diffracting optical element, said scanning optical device being arranged in such a manner that asymmetric magnification (component of slope of magnification) in the main scanning direction on the surface to be scanned is adjusted by displacing the refraction section or a scanning section comprising the refraction section and a deflecting element or/and the diffraction section in the main scanning direction.

Particularly, the optical scanning device is characterized:

in that said diffracting optical element is constructed as a separate unit from the other optical elements forming said scanning optical device;

in that each unit of said refraction section or the scanning section comprising the refraction section and the deflecting element and said diffraction section is fixed to a sheet metal stay;

in that a direction of displacement in the main scanning direction of said refraction section or the scanning section comprising the refraction section and the deflecting element and said diffraction section is a direction parallel to the main scanning direction or a direction of rotation about the optical axis within a plane including the main scanning direction;

in that said diffracting optical element has a power in the main scanning direction and a power in the sub-scanning direction, said powers being different from each other;

in that said refraction section has a plastic toric lens having a power in the main scanning direction and a power in the sub-scanning direction, said powers being different from each other; and so on.

A further color image forming apparatus of the present invention is a color image forming apparatus comprising plural sets of a scanning optical device and an image carrying member corresponding thereto, said scanning optical device having an imaging system comprising a refraction section having at least one refracting optical element and a diffraction section having at least one diffracting optical element, the color image forming apparatus being arranged to guide light emitted from each scanning optical device onto a surface of each corresponding image carrying member, to scan the surfaces of the image carrying members with the respective beams, to form images of different colors on the surfaces of the respective image carrying members, and to form a color image from the images formed on the surfaces of the plural image carrying members, wherein each of the plurality of scanning optical devices is arranged in such a manner that an irradiation position of the light on the surface of the image carrying member is adjusted by displacing the diffracting optical element, and wherein each of said plural scanning optical devices is arranged in such a manner that asymmetric magnification (component of slope of magnification) in the main scanning direction on the surface of the image carrying member is adjusted by displacing the refraction section or a scanning section comprising the refraction section and a deflecting element or/and the diffraction section in the main scanning direction.

Particularly, the color image forming apparatus is characterized:

in that said diffracting optical element is constructed as a separate unit from the other optical elements forming said scanning optical device;

in that a direction of displacement of the diffracting optical element is a direction of rotation about the optical axis or a direction of rotation about an axis along the longitudinal direction of the diffracting optical element and the diffracting optical element is arranged to be rotatable independently in each of these directions;

in that a slant of a scanning line on the surface of said image carrying member is adjusted by rotating said diffracting optical element about the optical axis or within a plane normal to the optical axis;

in that a curve of a scanning line on the surface of said image carrying member is adjusted by rotating said diffracting optical element about the axis along the longitudinal direction of the diffracting optical element;

in that said diffracting optical element is displaced based on a signal from detecting means for detecting registration;

in that said diffracting optical element has a power in the main scanning direction and a power in the sub-scanning direction, said powers being different from each other;

in that said refraction section has a plastic toric lens having a power in the main scanning direction and a power in the sub-scanning direction, said powers being different from each other;

in that each unit of said refraction section or the scanning section comprising the refraction section and the deflecting element and said diffraction section is fixed to a sheet metal stay;

in that a direction of displacement in the main scanning direction of said refraction section or the scanning section comprising the refraction section and the deflecting element and said diffraction section is a direction parallel to the main scanning direction or a direction of rotation about the optical axis within a plane including the main scanning direction; and so on.

Still another color image forming apparatus of the present invention is a color image forming apparatus comprising plural sets of a scanning optical device and an image carrying member corresponding thereto, said color image forming apparatus being arranged to guide light emitted from each scanning optical device onto a surface of each corresponding image carrying member, to scan the surfaces of the image carrying members with the respective beams, to form images of different colors on the surfaces of the respective image carrying members, and to form a color image from the images formed on the surfaces of the plural image carrying members, each of said plural scanning optical devices comprising:
light source means comprising a semiconductor laser;
a first optical element for converting light emitted from the light source means into a substantially parallel beam;
a second optical element for focusing the substantially parallel beam thus converted, into a line image longitudinal in the main scanning direction on a deflection surface of a deflecting element; and
a third optical element comprising a refraction section having at least one refracting optical element and a diffraction section having at least one diffracting optical element for focusing a beam deflected by the deflecting element in a spot shape on the surface of the image carrying member, wherein each of said plural scanning optical devices is arranged in such a manner that an irradiation position of the beam on the surface of the image carrying member is adjusted by displacing the diffracting optical element, and wherein each of said plural scanning optical devices is arranged in such a manner that asymmetric magnification (component of slope of magnification) in the main scanning direction on the surface of the image carrying member is adjusted by displacing the refraction section or a scanning section comprising the refraction section and the deflecting element or/and the diffraction section in the main scanning direction.

Particularly, the color image forming apparatus is characterized:

in that said diffracting optical element is constructed as a separate unit from the other optical elements forming said scanning optical device;

in that a direction of displacement of the diffracting optical element is a direction of rotation about the optical axis or a direction of rotation about an axis along the longitudinal direction of the diffracting optical element and the diffracting optical element is arranged to be rotatable independently in each of these directions;

in that a slant of a scanning line on the surface of said image carrying member is adjusted by rotating said diffracting optical element about the optical axis or within a plane normal to the optical axis;

in that a curve of a scanning line on the surface of said image carrying member is adjusted by rotating said diffracting optical element about the axis along the longitudinal direction of the diffracting optical element;

in that said diffracting optical element is displaced based on a signal from detecting means for detecting registration;

in that said diffracting optical element has a power in the main scanning direction and a power in the sub-scanning direction, said powers being different from each other;

in that said refraction section has a plastic toric lens having a power in the main scanning direction and a power in the sub-scanning direction, said powers being different from each other;

in that each unit of said refraction section or the scanning section comprising the refraction section and the deflecting element and said diffraction section is fixed to a sheet metal stay;

in that a direction of displacement in the main scanning direction of said refraction section or the scanning section comprising the refraction section and the deflecting element and said diffraction section is a direction parallel to the main scanning direction or a direction of rotation about the optical axis within a plane including the main scanning direction; and so on.

A further scanning optical device of the present invention is a scanning optical device for scanning a surface to be scanned, using an imaging system comprising a refraction section having at least one refracting optical element and a diffraction section having at least one diffracting optical element, said scanning optical device being arranged in such a manner that an irradiation position of a beam on the surface to be scanned is adjusted by displacing the diffracting optical element, and said scanning optical device being arranged in such a manner that asymmetric magnification (component of slope of magnification) in the main scanning direction on the surface to be scanned is adjusted by displacing the refraction section or a scanning section comprising the refraction section and a deflecting element or/and the diffraction section in the main scanning direction.

Particularly, the scanning optical device is characterized:

in that said diffracting optical element is constructed as a separate unit from the other optical elements forming said scanning optical device;

in that a direction of displacement of the diffracting optical element is a direction of rotation about the optical axis or a direction of rotation about an axis along the longitudinal direction of the diffracting optical element and the diffracting optical element is arranged to be rotatable independently in each of these directions;

in that a slant of a scanning line on the surface to be scanned is adjusted by rotating said diffracting optical element about the optical axis or within a plane normal to the optical axis;

in that a curve of a scanning line on the surface to be scanned is adjusted by rotating said diffracting optical element about the axis along the longitudinal direction of the diffracting optical element;

in that said diffracting optical element has a power in the main scanning direction and a power in the sub-scanning direction, said powers being different from each other;

in that said refraction section has a plastic toric lens having a power in the main scanning direction and a power in the sub-scanning direction, said powers being different from each other;

in that each unit of said refraction section or the scanning section comprising the refraction section and the deflecting element and said diffraction section is fixed to a sheet metal stay;

in that a direction of displacement in the main scanning direction of said refraction section or the scanning section comprising the refraction section and the deflecting element and said diffraction section is a direction parallel to the main scanning direction or a direction of rotation about the optical axis within a plane including the main scanning direction; and so on.

DETAILED DESCRIPTION OF THE PREFERRED EMBODIMENTS

Figure 1:
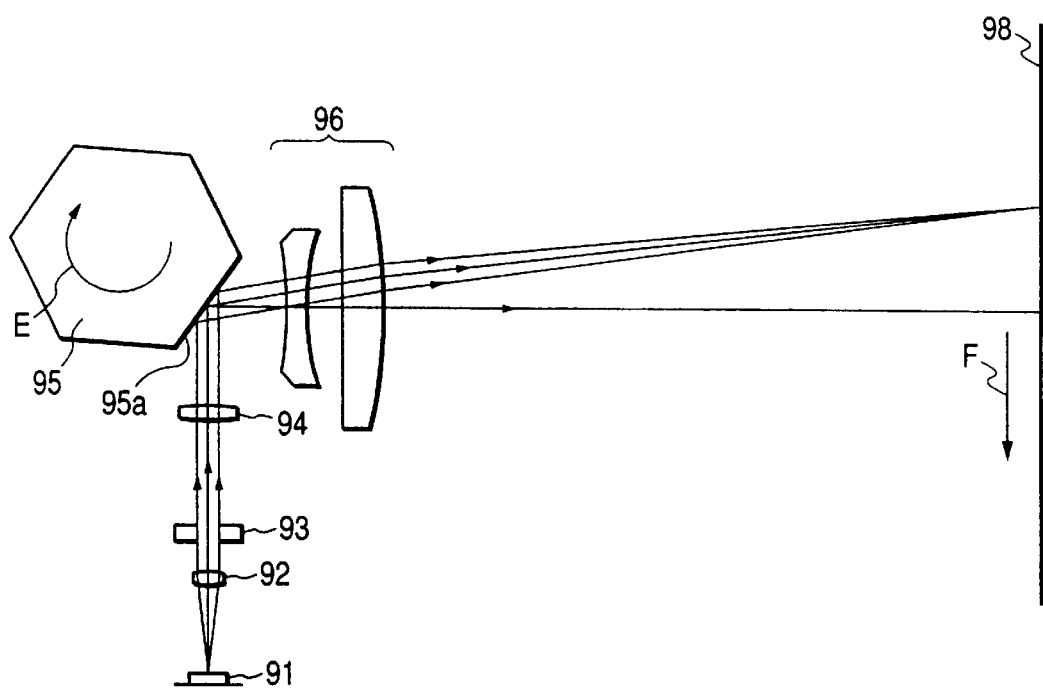
FIG. 1 is a sectional view of main part of the conventional scanning optical device along the main scanning direction.
Figure 2:
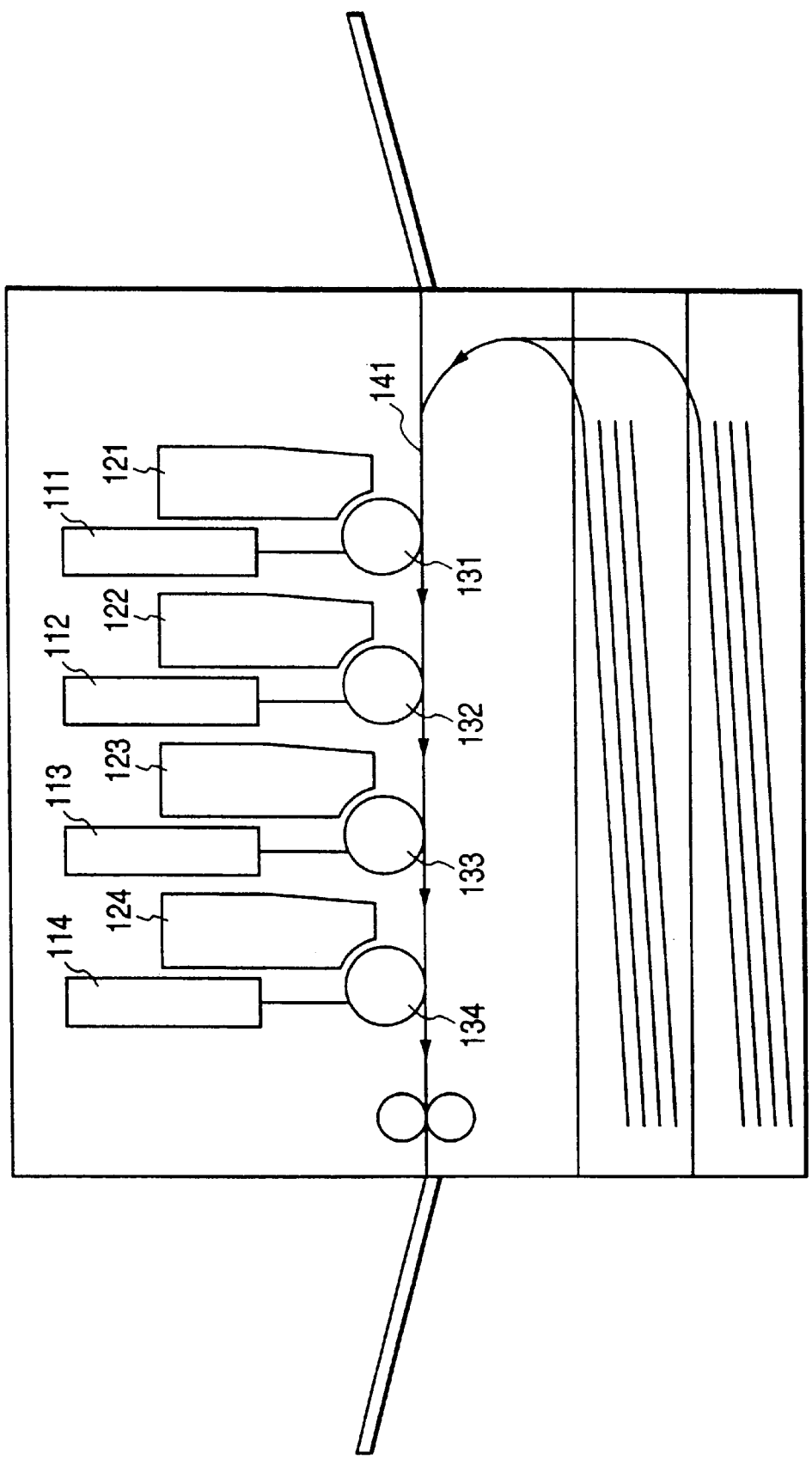
FIG. 2 is a schematic diagram to show the main part of the conventional color image forming apparatus.
Figure 3:
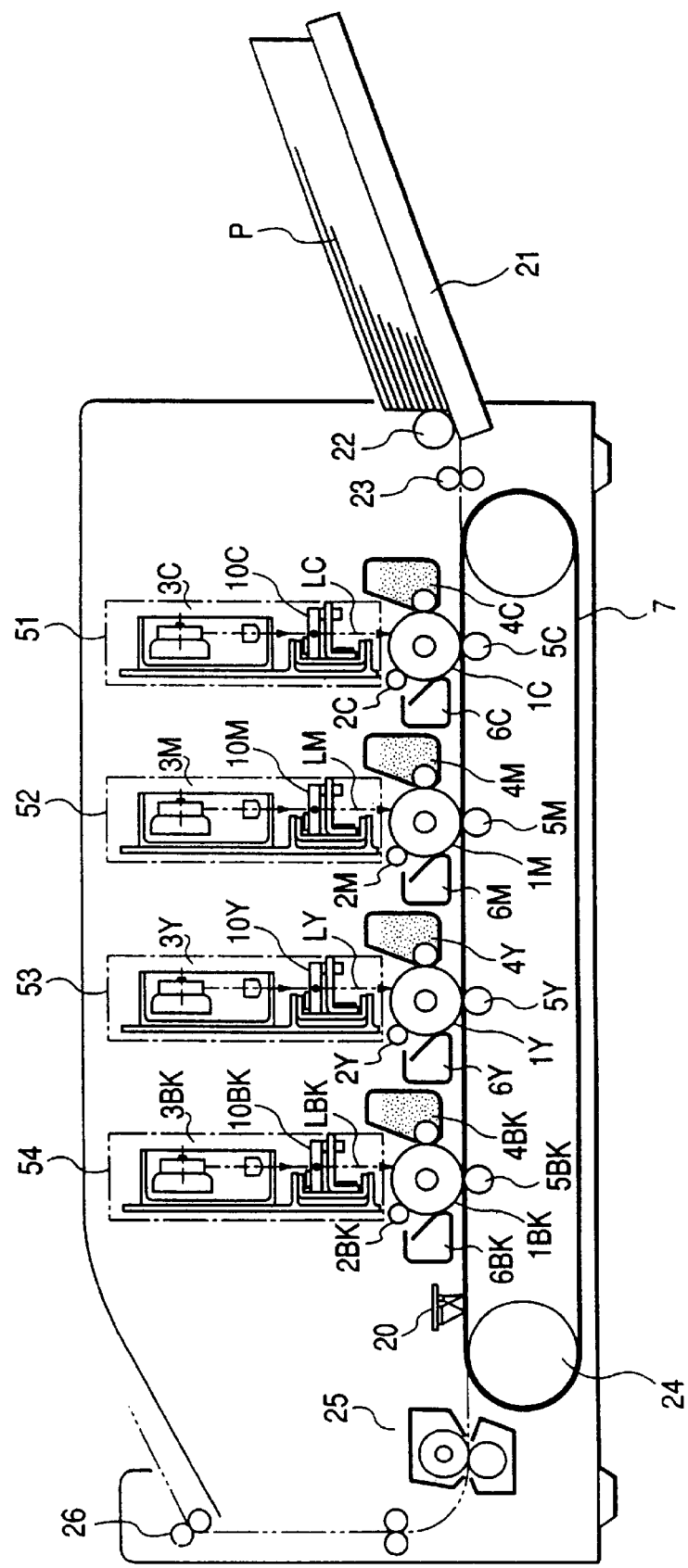
FIG. 3 is a schematic diagram to show the main part of a color image forming apparatus in Embodiment 1 of the present invention.

FIG. 3 is a schematic diagram to show the main part of the color image forming apparatus in Embodiment 1 of the present invention.

In FIG. 3 numerals 51, 52, 53, and 54 each represent the scanning optical devices constructed in the structure described hereinafter, and symbols 1C, 1M, 1Y, and 1BK each represent the photosensitive drums as image carrying members.

In the present embodiment each beam (laser light) LC, LM, LY, or LBK optically modulated based on image information is emitted from a scanning section 3C, 3M, 3Y, or 3BK described hereinafter, passes through a diffracting optical element 10C, 10M, 10Y, or 10BK described hereinafter, and thereafter irradiates the surface of each corresponding photosensitive drum 1C, 1M, 1Y, or 1BK to form a latent image thereon. This latent image is formed on the photosensitive drum 1C, 1M, 1Y, or 1BK each being charged uniformly by a primary charger 2C, 2M, 2Y, or 2BK and is developed into a visible image of cyan, magenta, yellow, or black by a developing unit 4C, 4M, 4Y, or 4BK. The images are electrostatically transferred in order onto a transfer medium P conveyed on a transfer belt 7, by transfer rollers 5C, 5M, 5Y, and 5BK, thereby forming a color image. The residual toner remaining thereafter on the surfaces of the photosensitive drums 1C, 1M, 1Y, and 1BK is removed by cleaners 6C, 6M, 6Y, and 6BK and the photosensitive drums are again charged uniformly by the primary chargers 2C, 2M, 2Y, and 2BK for formation of the next color image.

Transfer sheets P are stacked on a sheet supply tray 21 and are fed one by one in order by a sheet feed roller 22. Each transfer sheet is fed onto the transfer belt 7 with being timed with write start timing of image by registration rollers 23. While the transfer sheet is accurately conveyed on the transfer belt 7, the image of cyan, the image of magenta, the image of yellow, and the image of black formed on the surfaces of the photosensitive drums 1C, 1M, 1Y, 1BK are transferred in order onto the transfer sheet P to form a color image thereon. A driving roller 24 is arranged to perform accurate feeding of the transfer belt and is connected to a driving motor with small rotation irregularities (not illustrated). The color image formed on the transfer sheet P is thermally fixed by a fixing device 25 and thereafter the transfer sheet is discharged out of the apparatus while being conveyed by discharge rollers 26 etc.

Next described is the registration for accurate alignment of the four colors of cyan, magenta, yellow, and black in the color image forming apparatus of the present embodiment.

The color image forming apparatus of the present embodiment has the function to adjust the registration by forming registration detection images and providing a detecting device 20 for reading the registration detection images.

Figure 4:
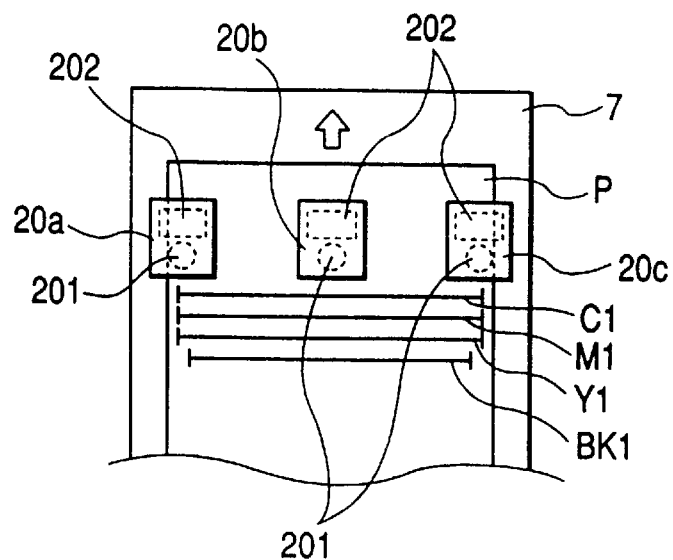
FIG. 4 is a schematic diagram to show the main part around the detecting means illustrated in FIG. 3.

A method for detecting the registration will be described first using FIG. 4.

The registration detection images C1 (cyan), M1 (magenta), Y1 (yellow), and BK1 (black) are formed in order on the transfer sheet P accurately conveyed on the transfer belt 7. These registration detection images C1, M1, Y1, BK1 are preferably images in each of which vertical lines are formed left and right and a horizontal line connects them, for example, as illustrated in FIG. 4. When these registration detection images C1, M1, Y1, BK1 of the four colors are formed in order, the detecting device 20 comprised of detection sensor portions 20a, 20b, 20c disposed at the left edge, at the center, and at the right edge, respectively, can detect positional deviation in the traveling direction (an arrow) of the transfer sheet P (positional deviation of the leading edge), lateral positional deviation (positional deviation of the left edge), overall magnification deviation appearing as different line lengths in the lateral direction, slant deviation appearing as a slant of a horizontal line drawn at right angles with the traveling direction of the transfer sheet, a curve of a scanning line appearing as curving of the horizontal line, and so on.

Each of the detection sensor portions 20a, 20b, 20c is provided with a light source 201 and an image pickup section 202 (CCD or the like) for detecting a position of the registration detection image, and is arranged to detect how much the vertical line and horizontal line of the registration detection image deviate from a reference position, whereby the sensor portions can detect which deviation out of the aforementioned deviations occurs, separately.

The adjustment of the registration will be described in order.

The positional deviation in the traveling direction of the transfer sheet P (positional deviation of the leading edge) can be corrected by adjusting the write start timing of each color image. The positional deviation in the lateral direction (positional deviation of the left edge) can also be corrected by generating a horizontal synchronous signal of beam and adjusting the write start timing of image so as to eliminate deviation among the colors, thereby achieving synchronism. The overall magnification deviation can be corrected by changing a modulation frequency for optical modulation of the light of each color so as to achieve magnification correction.

However, a large and expensive configuration is necessary for adjustment of the slant deviation of scanning line and the curve of scanning line by changing the image signals. Further, it is difficult to correct these two deviations in a configuration for successively supplying the image signals. Therefore, large-capacity memories are first necessary for storing the image signals for some lines. Further, the transmission sequence of the image signals has to be changed according to a slant deviation amount or a curve amount of scanning line.

As described, it is very difficult to electrically adjust (correct) the slant deviation of scanning line and the curve of scanning line and the like. In the present embodiment, therefore, the above slant deviation of scanning line and curve of scanning line are adjusted by displacing the diffracting optical element of the diffraction section forming an imaging system as will be described hereinafter, so as to adjust the irradiation position of the beam on the surface of photosensitive drum, whereby the registration deviation in the sub-scanning direction among the colors is suppressed to the low level.

Next described are methods for adjusting (correcting) the slant deviation of scanning line, the curve of scanning line, etc. of the scanning optical device characterizing the present invention and the optical elements thereof.

Figure 5:
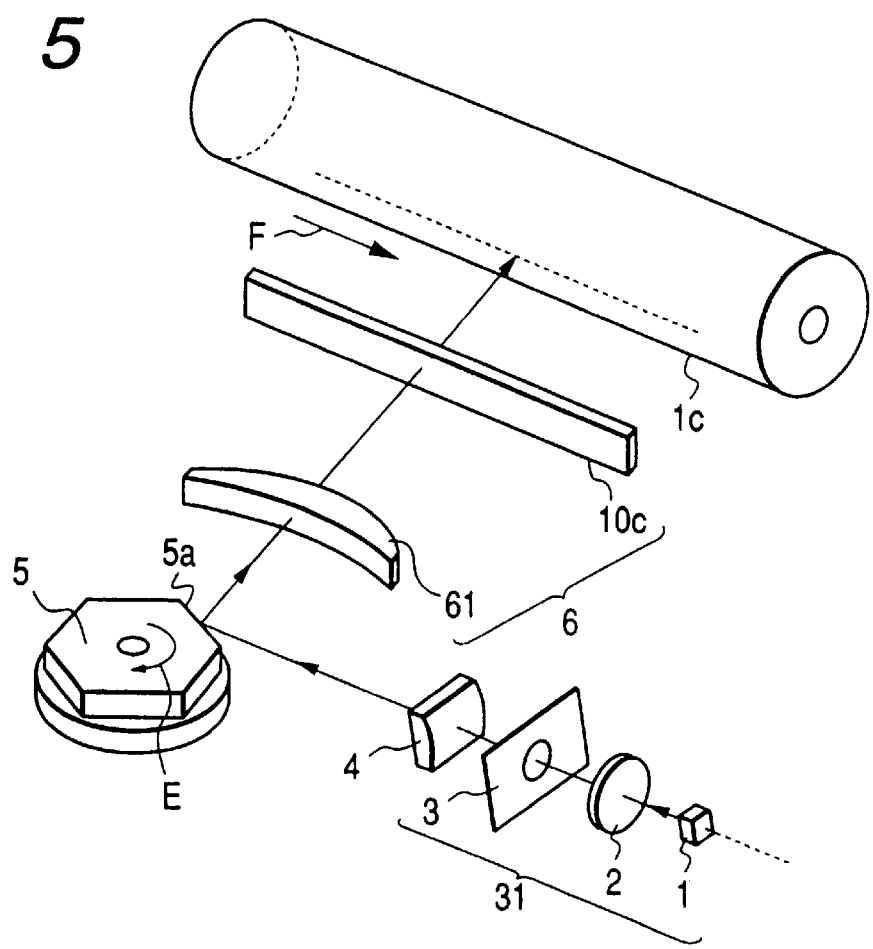
FIG. 5 is a schematic diagram of main part to show the scanning optical device illustrated in FIG. 3 and the image carrying member corresponding thereto.
Figure 6:
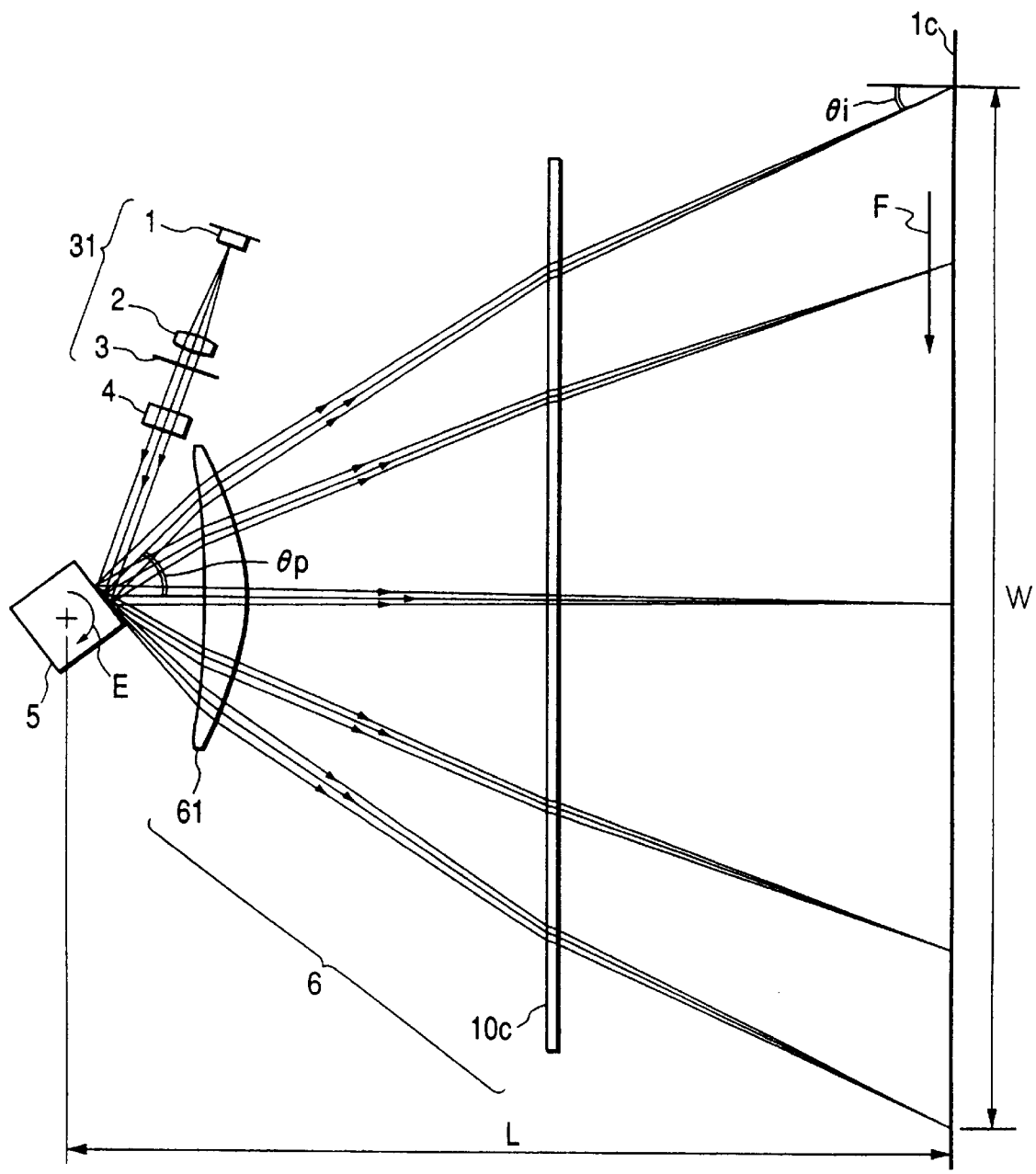
FIG. 6 is a sectional view of main part of the optical system illustrated in FIG. 4, along the main scanning direction.

FIG. 5 is a schematic diagram of main part to show one scanning optical device 51 and the image carrying member 1C corresponding thereto and FIG. 6 is a sectional view of the main part along the main scanning direction of the optical system illustrated in FIG. 5.

In FIG. 5 and FIG. 6 reference numeral 1 represents a light source unit, which is comprised, for example, of a semiconductor laser. Numeral 2 denotes a collimator lens as the first optical element, which converts a divergent beam (a light beam) emitted from the light source unit 1 into a nearly parallel beam. Numeral 3 designates an aperture stop which limits a beam of passing light (the amount of light). Numeral 4 indicates a cylindrical lens (cylinder lens) as the second optical element, which has a predetermined refractive power only in the sub-scanning direction and which focuses the beam passing through the aperture stop 3 in the form of an almost line image on a deflection surface 5a of an optical deflector 5 described hereinafter in the sub-scanning cross section.

Numeral 5 stands for the optical deflector, for example comprised of a polygon mirror (rotary polygon mirror), as a deflecting element, which is rotated at constant speed in the direction of arrow E in the figure by a driving unit such as a motor or the like (not illustrated).

Numeral 6 designates a scanning optical element as the third optical element (imaging system) having the fθ characteristics, which has a refraction section having at least one refracting optical element and a diffraction section having at least one diffracting optical element. The refraction section is comprised of a single plastic toric lens 61 having a power in the main scanning direction and a power in the sub-scanning direction, the powers being different from each other, and the two lens surfaces of the toric lens 61 are aspherical in the main scanning direction. The diffraction section has a long diffracting optical element 10c having a power in the main scanning direction and a power in the sub-scanning direction, the powers being different from each other. In the present embodiment the aforementioned slant deviation of scanning line and curve of scanning line are adjusted in such a manner that the diffracting optical element 10c is displaced based on a signal from the detecting device 20 for detecting the registration, so as to adjust the irradiation position (the incident position) of the beam on the surface of the photosensitive drum (the surface to be scanned), whereby the registration deviation in the sub-scanning direction among the colors is suppressed to the low level. The same effect can also be achieved by printing the registration detection images and making an operator adjust the position of the diffracting optical element 10c, based on the printed information, instead of using the aforementioned detecting device 20.

In the present embodiment the toric lens 61 is located on the optical deflector 5 side while the diffracting optical element 10c on the photosensitive drum 1C surface side with respect to the middle point between the rotational axis of the optical deflector 5 and the surface of the photosensitive drum 1C (the surface to be scanned). The scanning optical element 6 focuses the beam based on the image information, deflected by the optical deflector 5, on the surface of the photosensitive drum 1C and also correct face inclination of the deflection surface 5a of the optical deflector 5 in the sub-scanning cross section. In the present embodiment the diffracting optical element 10c is made of a plastic material by injection molding, but, without having to be limited to this, the like effect can also be achieved, for example, by forming a diffraction grating on a glass substrate with a replica. Each of the elements denoted by reference numerals 1, 2, 3, 4, 5, and 61 constitutes an element of the scanning section 3c. In the present embodiment this scanning section 3c and the diffracting optical element 10c are fixed separately to the body chassis.

In the scanning optical device 51 in the present embodiment the divergent beam emitted from the semiconductor laser 1 is converted into a nearly parallel beam by the collimator lens 2 and the beam (light amount) is limited by the aperture stop 3 to be incident to the cylindrical lens 4. The nearly parallel beam incident to the cylindrical lens 4 is emergent therefrom as it is, in the main scanning cross section. In the sub-scanning cross section the beam is converged to be focused as a nearly line image (a line image longitudinal in the main scanning direction) on the deflection surface 5a of the optical deflector 5. Then the beam deflected by the deflection surface 5a of the optical deflector 5 is guided through the toric lens 61 and diffracting optical element 10c onto the surface of the photosensitive drum 1C, and the beam optically scans the surface of the photosensitive drum 1C in the direction of arrow F by rotating the optical deflector 5 in the direction of arrow E. Then latent images, for example, of C (cyan), M (magenta), Y (yellow), and B (black) are formed on the surfaces of the corresponding photosensitive drums 1C, 1M, 1Y, and 1BK as described above and thereafter the images of the colors are transferred as a superimposed image on the transfer sheet P to form a single full color image thereon.

In the present embodiment each of shapes of the toric lens 61 and the diffracting optical element 10c forming the third optical element (imaging system) 6 of the scanning optical device 51 can be expressed as, follows.

(1) The toric lens: the curves in the main scanning cross section are of the aspherical shapes that can be expressed by functions up to the tenth order.

Let us define the origin at the intersecting point with the optical axis of the toric lens, the x-axis along the direction of the optical axis, the y-axis along a direction perpendicular to the optical axis in the main scanning cross section, and the z-axis along a direction perpendicular to the optical axis in the sub-scanning cross section.

Then, the curves in the direction of the generating line corresponding to the main scanning direction can be expressed by the following equation:

$$x=(Y^2/R)/\{1+(1-(1+K)(Y/R)^2)^{1/2}\}+B_4Y^4+B_6Y^6+B_8Y^8+B_{10}Y^{10}$$

(where R is the radius of curvature and K, $B_4$, $B_6$, $B_8$, and $B_{10}$ are aspherical coefficients).

The curves in the direction of the sub-line corresponding to the sub-scanning direction (the direction including the optical axis and being perpendicular to the main scanning direction) can be expressed by the following equation:

$$S=(Z^2/r')/\{1+(1-(Z/r')^2)^{1/2}\}$$

where $r'=r_0(1+D_2Y^2+D_4Y^4+D_6Y^6+D_8Y^8+D_{10}Y^{10})$ (where $r_0$ is the radius of curvature in the direction of the sub-line on the optical axis and $D_2$, $D_4$, $D_6$, $D_8$, and $D_{10}$ are aspherical coefficients).

(2) The diffracting optical element: the diffracting surface is a surface that can be expressed by a phase function up to the sixth order in the main scanning direction and second-order phase functions differing depending upon positions in the main scanning direction, in the sub-scanning direction.

The diffracting surface is expressed by the following equation:

$\phi = m\lambda = b_2Y^2 + b_4Y^4 + b_6Y^6 + (d_0 + d_1Y + d_2Y^2 + d_3Y^3 + d_4Y^4)Z^2$ (where $\phi$ is the phase function, m the order of diffraction, $\lambda$ the wavelength used, Y the height from the optical axis of lens, $b_2$, $b_4$, $b_6$, $d_0$, $d_1$, $d_2$, $d_3$, $d_4$ are phase coefficients, and + first-order diffracted light is used in Embodiment 1).

Table 1 shows the optical arrangement, the aspherical coefficients of the toric lens 61, and the phase terms of the diffracting optical element 10c in the present embodiment.

TABLE 1

(Design Data)

| wavelength, index | | |
|---|---|---|
| wavelength | $\lambda$ (nm) | 780 |
| index of toric lens 61 | nt | 1.5242 |
| index of element 62 | nd | 1.5242 |
| angle of rays | | |
| incident angle to polygon | $\theta p$ | 70.0 |
| max exit angle fr polygon | $\theta e$ | 45.0 |
| max incident angle to scanned face | $\theta i$ | 25.0 |
| arrangement | | |
| polygon axis-toric lens | e1 | 36.4 |
| center thickness of toric lens | d1 | 11.0 |
| toric lens-diffracting element | e2 | 86.0 |
| center thickness of diffracting element | d2 | 3.0 |
| diffracting element-scanned face | Sk | 110.0 |
| polygon axis-scanned face | L | 246.4 |
| effective scan width | W | 297.0 |

| | first face | second face |
|---|---|---|
| | toric lens 61 | |
| R | −1.41591E+02 | −6.18036E+01 |
| K | 5.27866E+00 | −6.46577E−01 |
| B4 | 1.21014E−06 | 4.20445E−07 |
| B6 | 7.51335E−11 | 2.81267E−10 |
| r | 1.44405E+02 | −2.51589E+01 |
| D2s | | 1.75165E−04 |
| D4s | | −3.02404E−08 |
| D6s | | 3.83856E−11 |
| D2e | | 2.46819E−04 |
| D4e | | −9.77441E−08 |
| D6e | | 7.36681E−11 |
| | surface shape of element 62 | |
| R | ∞ | ∞ |
| K | | |
| B4 | | |
| B6 | | |
| | phase function of element 62 | |
| b2 | | −2.50725E−04 |
| b4 | | −4.31479E−08 |
| b6 | | 1.23655E−12 |
| d0 | | −5.78930E−03 |
| d1 | | −9.57598E−07 |
| d2 | | 1.15549E−07 |
| d3 | | 3.71159E−11 |
| d4 | | 1.23655E−12 |

Suffix "s": laser side
Suffix "e": exit side

Figure 7A:
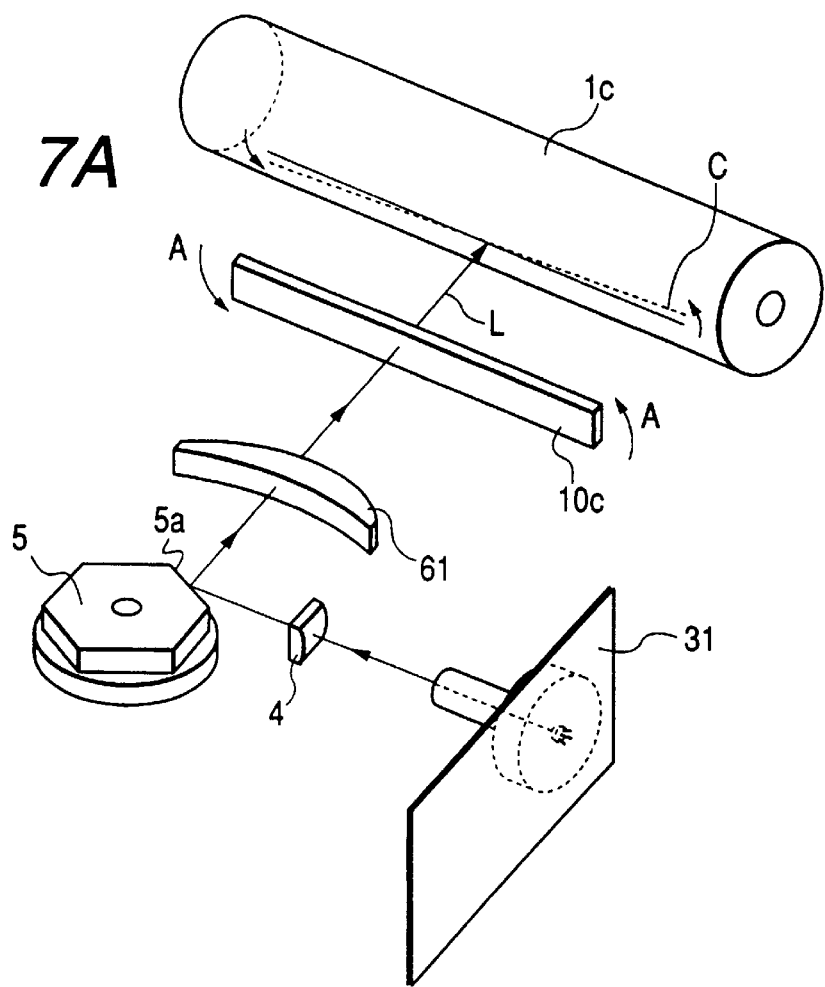
FIG. 7A is a schematic diagram to show the main part of the scanning optical device in Embodiment 1 of the present invention and FIG. 7B is an explanatory diagram to show the slant deviation of scanning line.

The adjustment (correction) of the slant deviation of scanning line in the scanning optical device will be described referring to FIGS. 7A and 7B. In FIG. 7A the same elements as those illustrated in FIG. 5 are denoted by the same reference symbols.

In FIG. 7A, as described previously, the light L source unit, the collimator lens, and the aperture stop, passes through the cylindrical lens 4 having the predetermined refractive power in the sub-scanning direction, is deflected and reflected by the optical deflector 5 to pass through the toric lens 61 and the diffracting optical element 10c, and thereafter illuminates the surface of the photosensitive drum 1C.

In the scanning optical device of the present embodiment the diffracting optical element is rotated (rotationally moved) in the direction of arrows A about the optical axis whereby the light L to scan the surface of the photosensitive drum is inclined as indicated by the dashed line C in FIG. 7A to scan the surface.

Figure 7B:
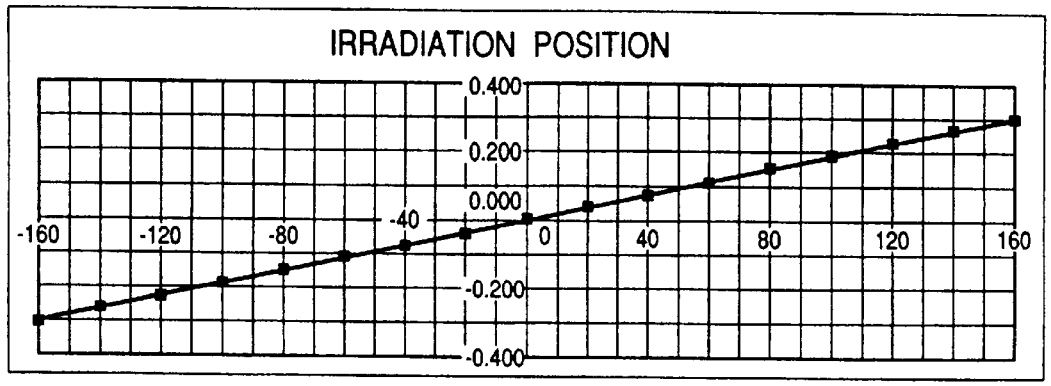

In the scanning optical device in the present embodiment, when the diffracting optical element is rotated by 10' in the direction of arrows A in the figure, the right end of the scanning line is raised by approximately 0.3 mm while the left end is lowered by approximately 0.3 mm on the surface of the photosensitive drum as illustrated in FIG. 7B.

Since the rotation amount (rotational movement amount) of the diffracting optical element is approximately proportional to the slant amount of the scanning line, the slant of scanning line can be adjusted by rotating the diffracting optical element by an amount necessary for correction for the slant deviation. Namely, in the present embodiment, the slant of scanning line can be adjusted by rotating the diffracting optical element about the optical axis by a predetermined amount, based on a signal (detection result) obtained by the aforementioned detecting device. It is desirable in the optical sense to rotate the diffracting optical element about the optical axis as described above, but the adjustment of the slant of scanning line can also be achieved by rotating the diffracting optical element within a plane normal to the optical axis, instead of rotating it about the optical axis.

Figure 8A:
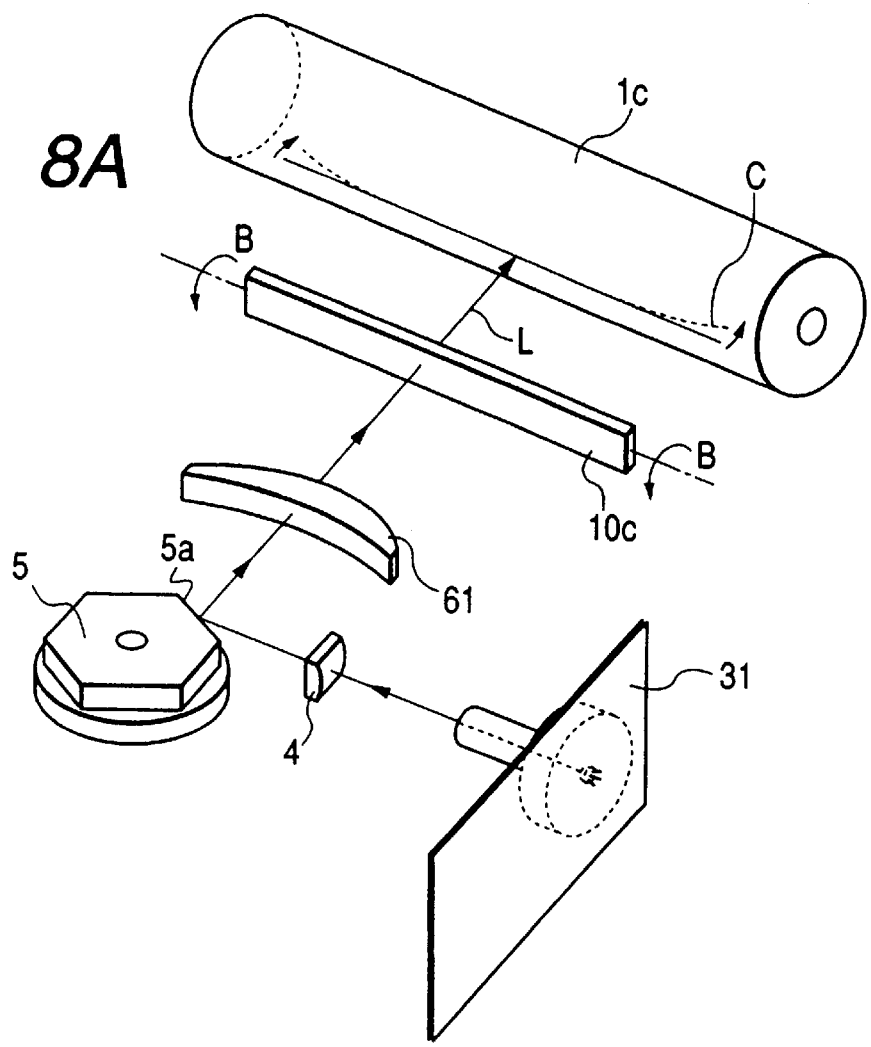
FIG. 8A is a schematic diagram to show the main part of the scanning optical device in Embodiment 1 of the present invention and FIG. 8B is an explanatory diagram to show the curve of scanning line.
Figure 8B:
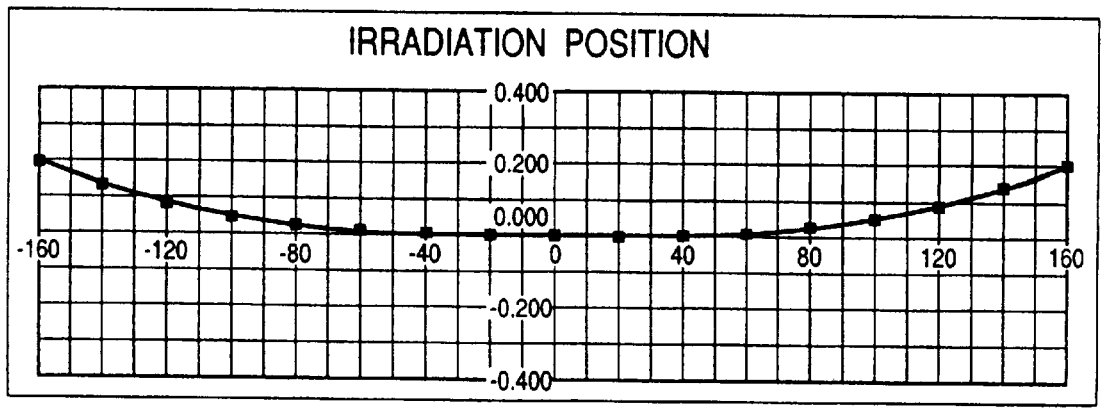

The adjustment (correction) of the curve of scanning line will be described below referring to FIGS. 8A and 8B. In FIG. 8A the same elements as those illustrated in FIG. 5 are denoted by the same reference symbols.

In the scanning optical device of the present embodiment, when the diffracting optical element is rotated (rotationally moved) in the direction of arrows B in the figure about the center axis (chain line) along the longitudinal direction of the diffracting optical element, the light L to scan the surface of the photosensitive drum is curved as indicated by the dashed line C in FIG. 8A to scan the surface of the photosensitive drum.

In the scanning optical device in the present embodiment, when the diffracting optical element is rotated by 1° in the direction of arrows B in the figure, the both ends of the scanning line are raised by approximately 0.2 mm on the surface of the photosensitive drum as illustrated in FIG. 7B, thus curving the scanning line. When the diffracting optical element is rotated in the reverse direction to the above direction, the scanning line is curved so as to lower the both ends of the scanning line.

Since the rotation amount (rotational movement amount) of the diffracting optical element is approximately proportional to the curve amount of the scanning line, the curve of scanning line can be adjusted by rotating the diffracting optical element by an amount necessary for correction for the curve of scanning line. Namely, the curve of scanning line can be adjusted by rotating the diffracting optical element about the center axis along the longitudinal direction of the diffracting optical element by a predetermined amount based on a signal (detection result) obtained by the aforementioned detecting device.

In the present embodiment the diffracting optical element is arranged so as to be rotatable independently in each of the two displacement directions (rotation directions).

The structure for rotating (rotationally moving) the diffracting optical element will be described below referring to FIG. 9 and FIG. 10.

Figure 9:
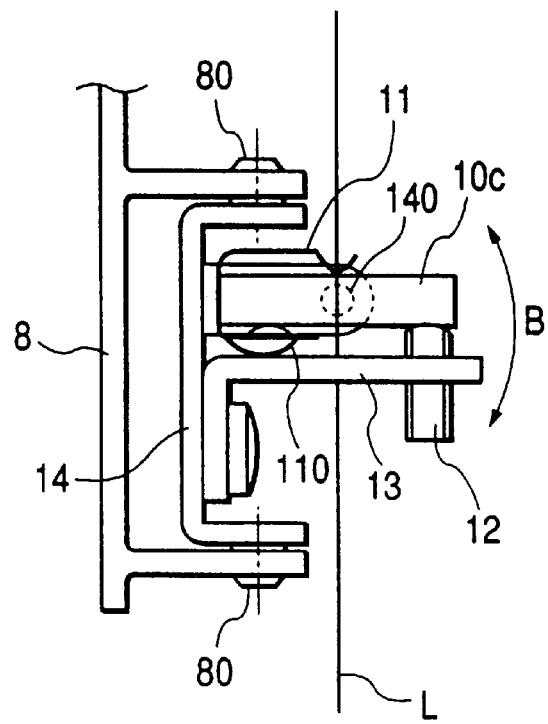
FIG. 9 is a structural diagram to show a mechanism for rotating the diffracting optical element in Embodiment 1 of the present invention.

FIG. 9 is a structural diagram of the main part to show the structure for rotating the diffracting optical element 10c in the directions of arrows B in the figure in order to adjust the curve (curving deviation) of scanning line. In FIG. 9 the diffracting optical element 10c is held by a spring member 11 and this spring member 11 is further held by rotation supports 140 so as to be rotatable with respect to a holding member 14. Further, an adjuster screw securing member 13 holding an adjuster screw 12 is also fixed to the holding member 14. In FIG. 9 the diffracting optical element is positioned in the rotation directions B by the adjuster screw 12 and a press portion 110 provided in the spring member 11, and thus the diffracting optical element 10c can be rotated by moving the adjuster screw 12.

Figure 10:
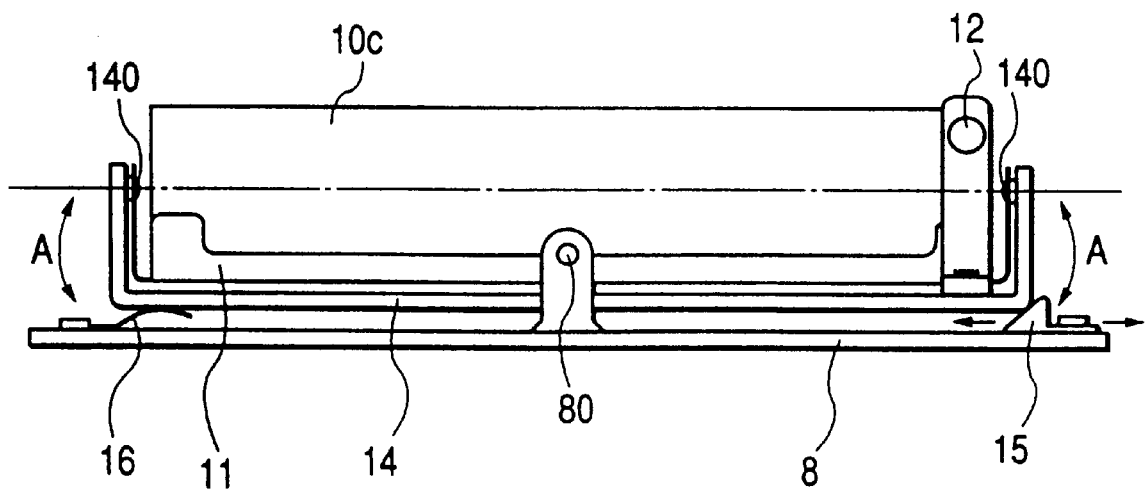
FIG. 10 is a structural diagram to show the mechanism for rotating the diffracting optical element in Embodiment 1 of the present invention.

FIG. 10 is a structural diagram of the main part to show the structure for rotating the diffracting optical element 10c in the directions of arrows A in order to adjust the slant deviation of scanning line. In the same figure the holding member 14 is held by rotation supports 80 so as to be rotatable with respect to the body chassis 8 to which the scanning section 3c etc. is fixed. The rotational position of the diffracting optical element in the directions of arrows A in the figure can be determined by angle adjusting member 15 and spring 16 disposed at the both ends of the holding member 14. For rotating the diffracting optical element 10c in the directions of arrows A in the figure in order to correct the slant deviation of scanning line, the angle adjusting member 15 is moved to the left or to the right to fix the diffracting optical element to the body chassis 8, thereby adjusting the diffracting optical element 10c.

In the present embodiment the scanning section and the diffracting optical element (diffraction section) are fixed separately to the body chassis as described previously. This is a result of consideration to convenience of adjustment. Mainly, in the case of the slant deviation of scanning line, a small inclination or the like of the body chassis directly results in the slant deviation on the image in each of the four colors, and thus delicate adjustment has to be carried out based on the registration detected among the four colors as described previously.

Figure 11:
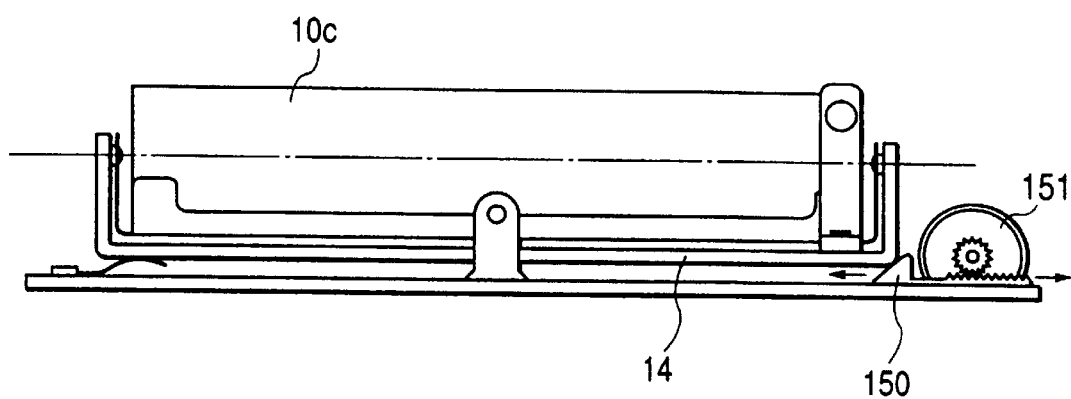
FIG. 11 is a structural diagram to show another mechanism for rotating the diffracting optical element in Embodiment 1 of the present invention.

A preferred structure is thus one as illustrated in FIG. 11 in which the angle adjusting member 150 is moved left and right by use of a stepping motor 151 or the like, so as to rotate the holding member 14 holding the diffracting optical element 10c. Provision of this adjusting function improves the operability of rotation and also permits adjustment of the slant deviation by driving the stepping motor when the slant deviation of scanning line is recognized in regular checks of registration.

In the present embodiment the diffracting optical element is rotated about the optical axis or within the plane normal to the optical axis or is rotated about the axis along the longitudinal direction of the diffracting optical element in order to adjust the slant of scanning line and the curve of scanning line as described above, but the present invention can also be applied, similarly to the above embodiment, to adjustment by displacing the diffracting optical element in the horizontal or vertical direction with respect to the photosensitive drum surface, depending upon the shape of the diffracting optical element.

The present embodiment was described above as to the color image forming apparatus provided with plural sets of the scanning optical device and the image carrying member corresponding thereto, but it is needless to mention that the present invention can also be applied to a single scanning optical device.

Figure 12:
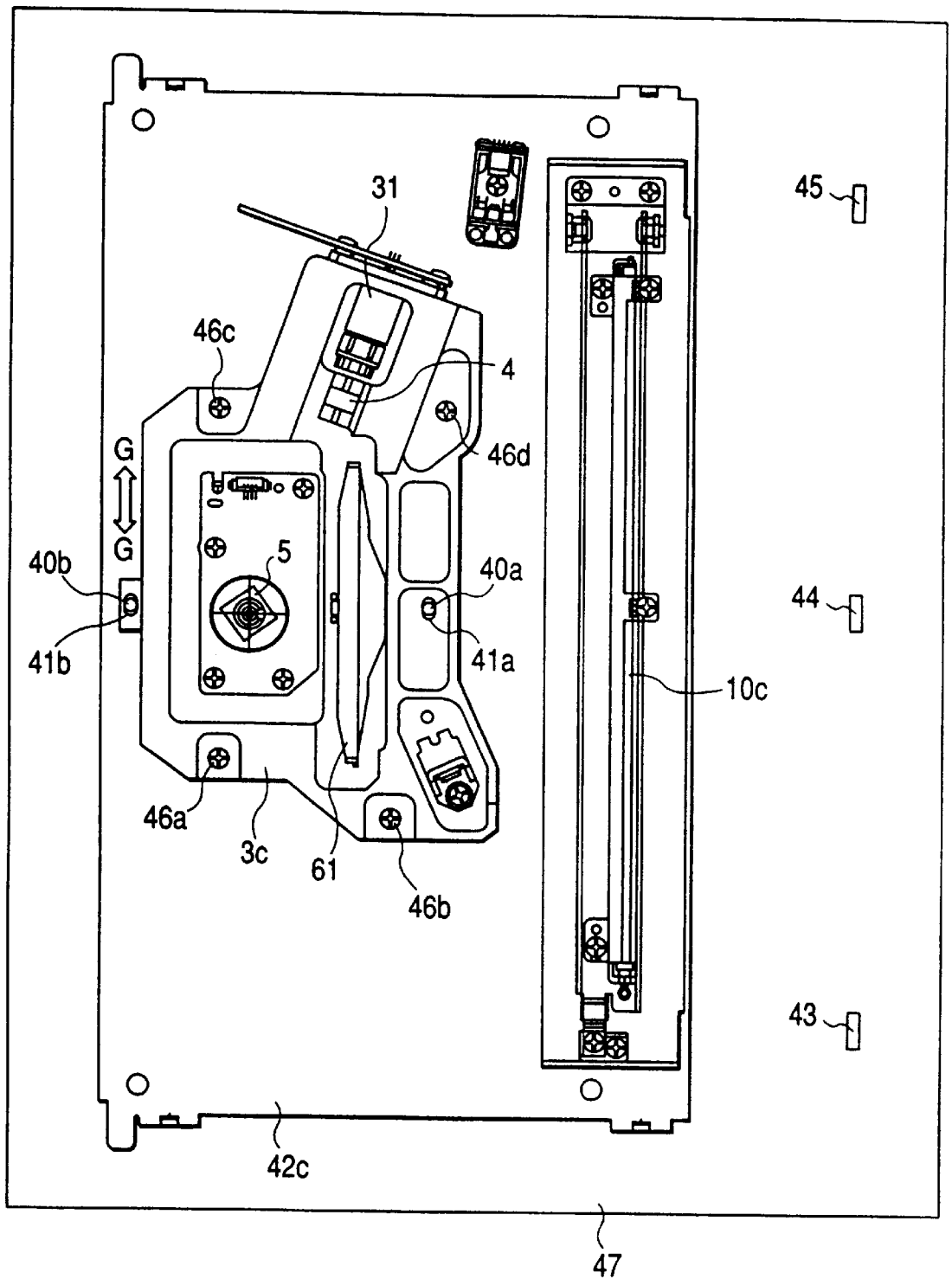
FIG. 12 is a structural diagram to show a mechanism of one scanning optical device in Embodiment 2 of the present invention.

FIG. 12 is a structural diagram to show a mechanism of one scanning optical device in Embodiment 2 of the present invention. In the same figure the same elements as those illustrated in FIG. 3 and FIG. 5 are denoted by the same reference symbols.

The present embodiment is different from Embodiment 1 described above in that the asymmetric magnification (component of slope of magnification) (image height deviation) in the main scanning direction on the surface of the image carrying member is adjusted by displacing the refraction section or the scanning section including the refraction section and the deflecting element or/and the diffraction section in the main scanning direction. The other structure and optical action are almost similar to those in Embodiment 1 described above.

In the present embodiment, as illustrated in FIG. 12, the scanning section 3C including the refraction section 61 and the optical deflector 5 is arranged to be movable in parallel to the directions GG (the main scanning directions), so as to adjust the asymmetric magnification (component of slope of magnification) in the main scanning direction on the surface of the image carrying member. In the same figure positioning pins 40a, 40b are fit in round long holes 41a, 41b provided on the scanning section 3C, and the length of the round long holes 41a, 41b is a movable range in the directions GG.

The adjustment of the asymmetric magnification (component of slope of magnification) (image height deviation) in the main scanning direction of the scanning optical device will be described below.

The diffracting optical element 10c is first fixed to a stay (sheet metal stay) 42c made of a sheet metal, and then the scanning section 3C is attached to the stay in a temporarily fixed state with screws 46a, 46b, 46c, 46d. Then the stay 42c is attached to an adjustment jig 47. On the adjustment jig 47 a write start sensor 43 is placed on the image write start side, a center sensor 44 at the center of image, and a write end sensor 45 on the image write end side. The center sensor 44 is located at the central position between the write start sensor 44 and the write end sensor 45. When times of scan of the light (laser light) are defined each as T1 (the scan time from the write start sensor 43 to the center sensor 44) and T2 (the scan time from the center sensor 44 to the write end sensor 45), the scanning section 3C is adjusted while being moved in the directions GG so as to make T1=T2 in the present embodiment. After completion of the positional adjustment of the scanning section 3C, the scanning section 3C is fixed to the stay 42c by further screwing each screw 46a, 46b, 46c, 46d.

Figure 18:
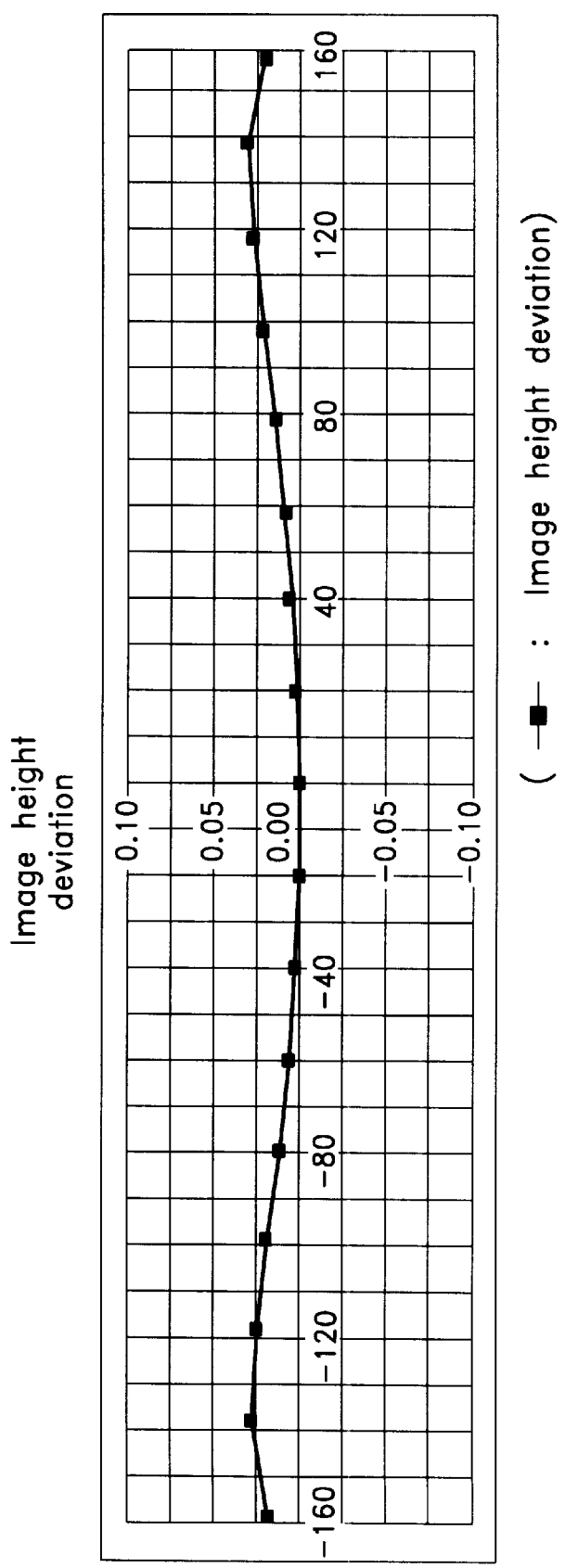
FIG. 18 shows asymmetric magnification correction amounts that can be corrected when a scanning section is moved in parallel in a direction of an embodiment of the present invention.

FIG. 18 shows asymmetric magnification (component of slope of magnification) correction amounts (image height deviation) that can be corrected when the scanning section 3C is moved in parallel by 0.1 mm in the directions GG in the present embodiment.

The present embodiment is arranged to move the scanning section 3C in parallel to the directions GG (in the main scanning direction), but, without having to be limited to this, the asymmetric magnification (component of slope of magnification) in the main scanning direction can also be corrected, for example, by rotating the scanning section in the main scanning direction about the optical axis (or about the deflection surface of the deflecting element 5) within a plane (within the main scanning plane) including the main scanning direction. In this case the same effect as above can be achieved by the adjusting method for rotationally adjust the scanning section 3C so that the times T1, T2 described above satisfy the condition of T1=T2.

Figure 19:
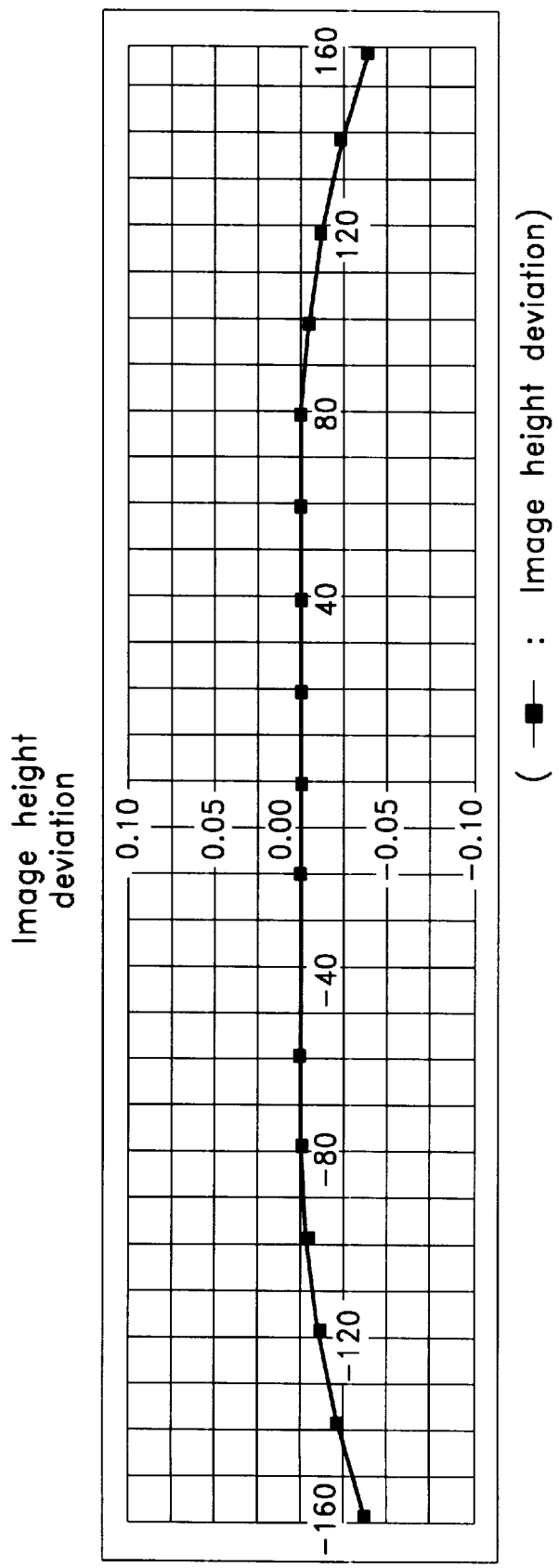
FIG. 19 shows asymmetric magnification correction amounts that can be corrected when a scanning section is rotated in the main scanning direction of an embodiment of the present invention.

FIG. 19 shows asymmetric magnification (component of slope of magnification) correction amounts (image height deviation) corrected when the scanning section 3C is rotated by 5' in the main scanning direction in the present embodiment.

Each of the four scanning sections 3C, 3M, 3Y, 3BK and each of the four diffracting optical elements 10C, 10M, 10Y, 10BK adjusted as described above are fixed to each of the four stays 42C, 42M, 42Y, 42BK, respectively. In the present embodiment these four stays 42C, 42M, 42Y, 42BK are made of a sheet metal as described previously. Since this sheet metal has rigidity, the stays are immune to a phenomenon that the adjusted portions suffer change due to deformation during assembling or the like thereafter, for example. Since the stays made of the sheet metal (the sheet metal stays) undergo little change or thermal expansion due to ambient temperatures, the four stays 42C, 42M, 42Y, 42BK will not be deformed thereby, so as to prevent the adjusted portions from changing.

As described above, the present embodiment is arranged to adjust the magnifications bias in the main scanning direction in each scanning optical device by displacing the scanning section 3C, 3M, 3Y, 3BK of each scanning optical device in the main scanning direction as described above, whereby the image height deviation in the main scanning direction can be suppressed to the low level by the simple structure.

The present embodiment is arranged to adjust the magnifications bias in the main scanning direction by moving or rotating the scanning section 3C in the directions GG (in the main scanning direction), but, without having to be limited to this, the same effect as above can also be achieved by moving or rotating the diffracting optical element 10c in the directions GG, for example. In addition, the same effect as above can also be achieved by moving or rotating the scanning section 3C and the diffracting optical element 10c relative to each other in the directions GG. The present embodiment is arranged to adjust the asymmetric magnification (component of slope of magnification) in the main scanning direction by moving or rotating the whole of the scanning section 3C including the refraction section 61 in the directions GG, but, without having to be limited to this, the same effect as above can also be achieved by moving or rotating only the refraction section 61 in the directions GG. In the present embodiment the scanning section 3C including the refraction section 61 is fixed to the sheet metal stay 42C, but only the refraction section 61 may be fixed thereto instead.

The present embodiment was described above as to the color image forming apparatus provided with plural sets of the scanning optical device and the image carrying member corresponding thereto, but it is a matter of course that the present invention can also be applied to a single scanning optical device.

Further, the present embodiment may be combined with Embodiment 1 described previously. Specifically, the color image forming apparatus is constructed with plural scanning optical devices in such structure that the irradiation position of the light on the image carrying member surface is adjusted by displacing the position of the diffracting optical element of each scanning optical device and the asymmetric magnification (component of slope of magnification) in the main scanning direction is adjusted by displacing the refraction section or the scanning section including the refraction section and the deflecting element or/and the diffraction section in the main scanning direction. This structure can enjoy the both effects of Embodiments 1, 2 described above, simultaneously.

Figure 13:
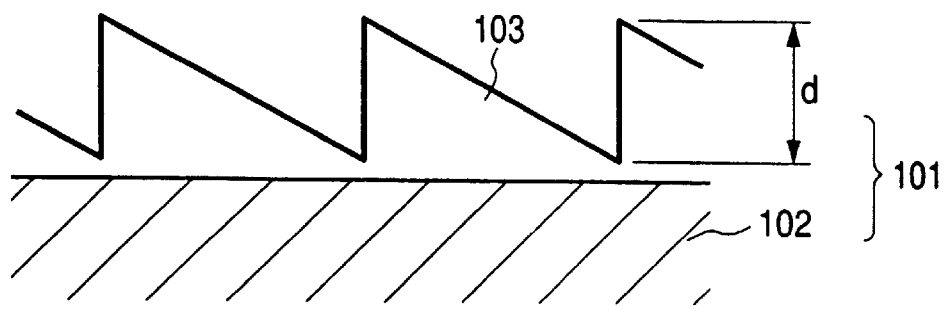
FIG. 13 is an explanatory diagram to illustrate a diffracting optical element associated with the present invention.
Figure 15:
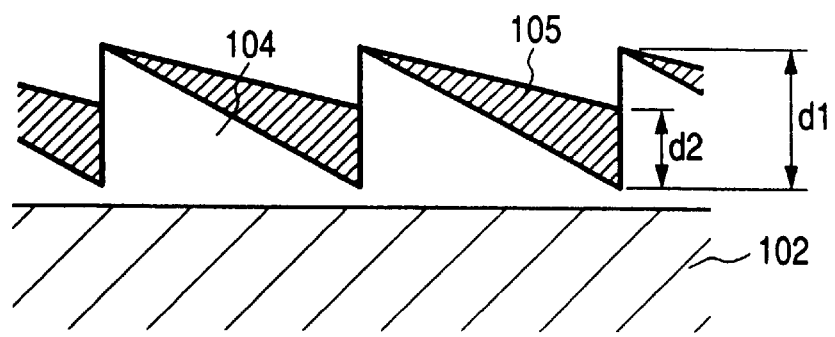
FIG. 15 is an explanatory diagram to illustrate another diffracting optical element associated with the present invention.

The structure of the diffracting optical element used in each embodiment can be one selected, for example, from the single-layer structure comprised of one layer of the kinoform type as illustrated in FIG. 13, the double-layer structure comprised of a stack of two layers having different (or equal) grating thicknesses as illustrated in FIG. 15, and so on.

Figure 14:
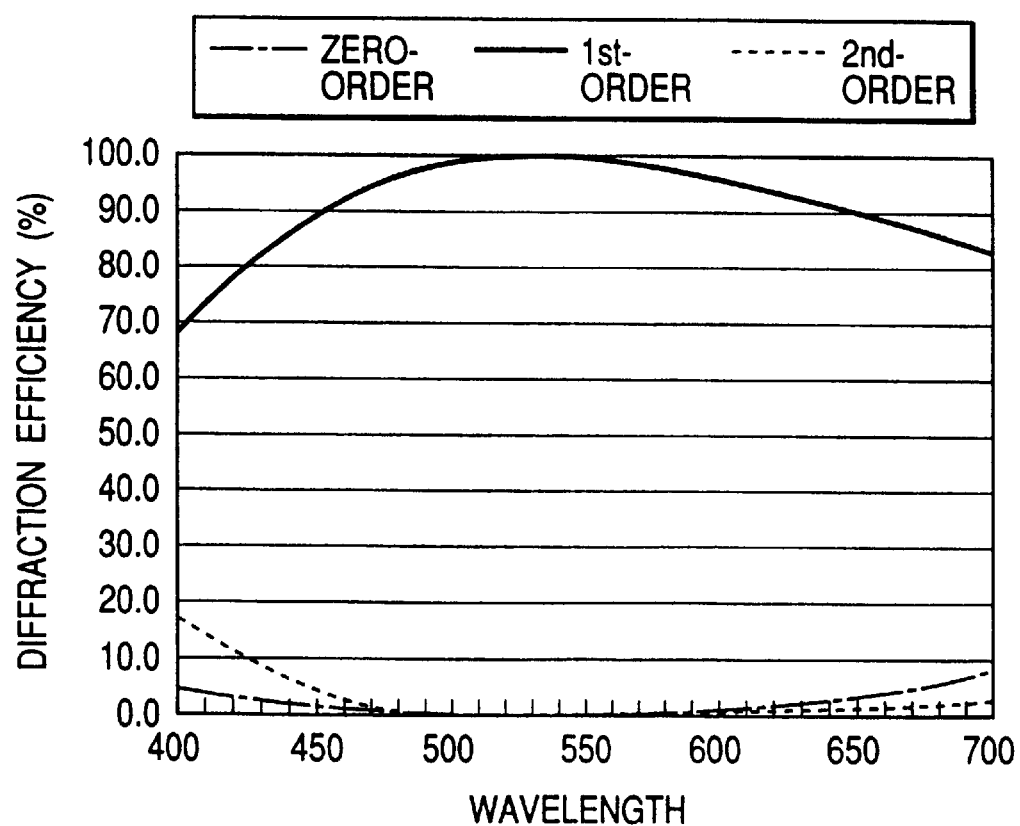
FIG. 14 is an explanatory diagram to illustrate wavelength dependence characteristics of the diffracting optical element associated with the present invention.

FIG. 14 is a diagram to show wavelength dependence characteristics of diffraction efficiency of first-order diffracted light of the diffracting optical element 101 illustrated in FIG. 13. In practice the diffracting optical element 101 is made by applying an ultraviolet-curing resin onto a surface of substrate 102 and forming a layer 103 in such a grating thickness d that the diffraction efficiency of the first-order diffracted light becomes 100% at the wavelength 530 nm, in the resin part.

As apparent from FIG. 14, the diffraction efficiencies of the designed order decrease with departing from the wavelength 530 nm at which the diffraction efficiency is optimized, whereas diffraction efficiencies of the zero-order diffracted light and the second-order diffracted light of the orders close to the designed order increase. The increase of diffracted light other than the designed order will result in flares and in turn decrease in the resolution of the optical system.

Figure 16:
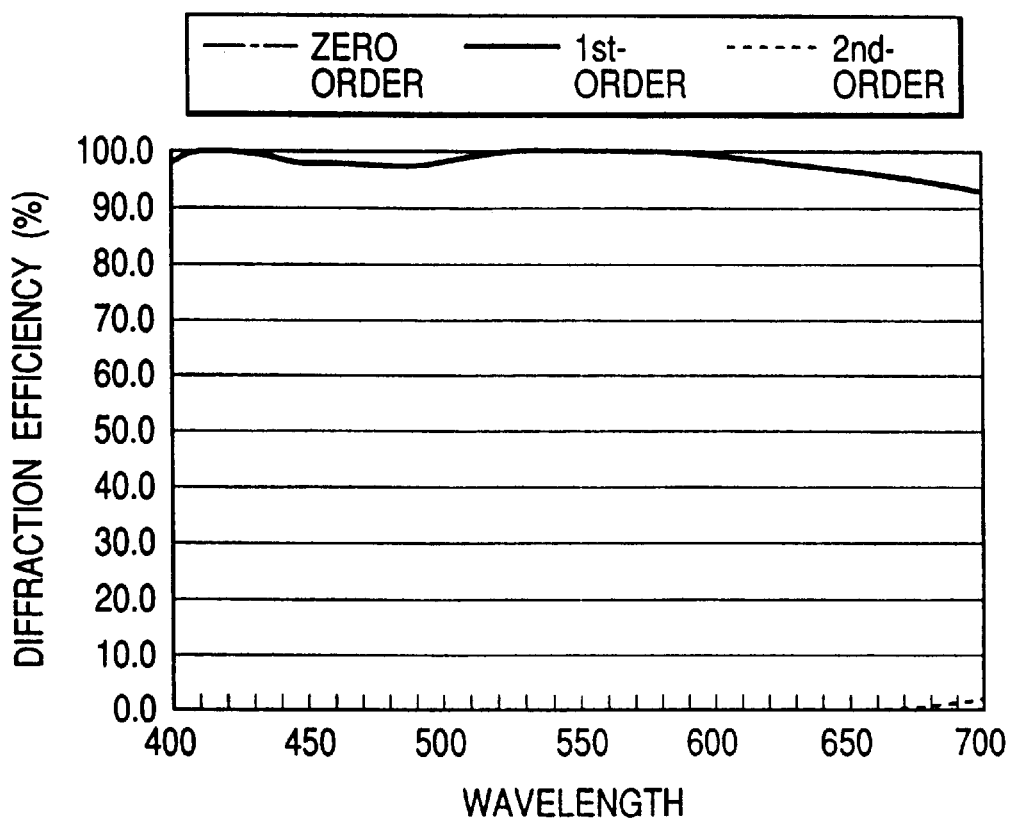
FIG. 16 is an explanatory diagram to illustrate wavelength dependence characteristics of the diffracting optical element associated with the present invention.

FIG. 16 shows the wavelength dependence characteristics of diffraction efficiency of the first-order diffracted light of the stack type diffracting optical element comprised of the stack of two layers 104, 105 illustrated in FIG. 15.

In FIG. 15 an ultraviolet-curing resin (nd=1.499, vd=54) is formed as the first layer 104 on the substrate 102 and another ultraviolet-curing resin (nd=1.598, vd=28) is further formed as the second layer 105 thereon. In this combination of the materials the grating thickness d1 of the first layer 104 is set to d1=13.8 µm and the grating thickness d2 of the second layer 105 to d2=10.5 µm.

As seen from FIG. 16, when the diffracting optical element is of the stack structure, the diffraction efficiencies of the designed order are high, not less than 95%, throughout the entire region of use wavelengths.

Figure 17:
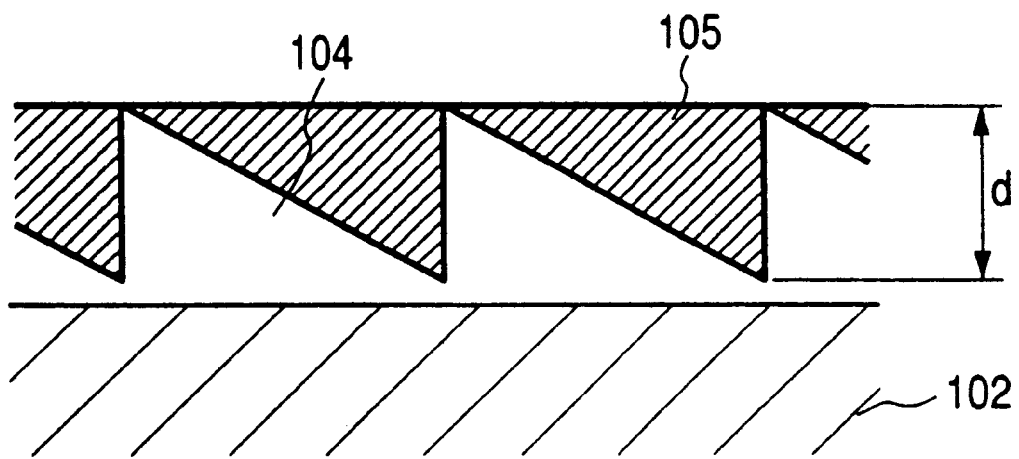
FIG. 17 is an explanatory diagram to illustrate another diffracting optical element associated with the present invention.

The materials for the diffracting optical element in the stack structure described above are not limited to the ultraviolet-curing resins, but other plastic materials etc. can also be used, or the first layer 104 may be formed directly in the substrate, though depending upon the substrate. The grating thicknesses do not always have to be different from each other, but the grating thicknesses of the two layers 104 and 105 may also be equal to each other as illustrated in FIG. 17, depending upon the combination of the materials.

In this case, since the grating shape is not formed in the surface of the diffracting optical element, this structure has an excellent dust-proofing property and can improve the assembling operability of the diffracting optical element.

As detailed above, the present invention can accomplish the compact color image forming apparatus and scanning optical device suitable for high-resolution printing, the color image forming apparatus having a plurality of scanning optical devices, wherein the registration deviation in the sub-scanning direction among the colors can be suppressed by the simple structure to adjust the slant deviation of scanning line and the curve of scanning line in each scanning optical device by displacing the diffracting optical element of the diffraction section of each scanning optical device and wherein the image height deviation can be suppressed by the simple structure to adjust the asymmetric magnification (component of slope of magnification) in the main scanning direction on the image carrying member surface in each scanning optical device by displacing the refraction section or the scanning section including the refraction section and the deflecting element or/and the diffraction section of each scanning optical device in the main scanning direction.

What is claimed is:

1. A color image forming apparatus comprising:

light source means;

a deflecting element for deflecting light emitted from said light source means;

optical means for guiding the light emitted from said light source means onto a surface to be scanned, said optical means comprising a refraction section having at least one refracting optical element and a diffraction section having at least one diffracting optical element;

a scanning optical device comprising said light source means, said deflecting element, and said optical means, said color image forming apparatus comprising a plurality of such scanning optical devices;

an image carrying member disposed on said surface to be scanned, a plurality of such image carrying members being provided corresponding to said scanning optical devices; and means for displacing said diffracting optical element.

2. The color image forming apparatus according to claim 1, wherein said diffracting optical element is constructed as a separate unit from the other optical elements forming said scanning optical device.

3. The color image forming apparatus according to claim 1, wherein a direction of displacement of said diffracting optical element is a direction of rotation about the optical axis or a direction of rotation about an axis along the longitudinal direction of the diffracting optical element, and wherein said diffracting optical element is arranged to be rotatable independently in each of these directions.

4. The color image forming apparatus according to claim 1, wherein a slant of a scanning line on a surface of said image carrying member is adjusted by rotating said diffracting optical element about the optical axis.

5. The color image forming apparatus according to claim 1, wherein a curve of a scanning line on a surface of said image carrying member is adjusted by rotating said diffracting optical element about an axis along the longitudinal direction of the diffracting optical element.

6. The color image forming apparatus according to claim 1, wherein said diffracting optical element is displaced, based on a signal from detecting means for detecting registration.

7. The color image forming apparatus according to claim 1, wherein said diffracting optical element has a power in the main scanning direction and a power in the sub-scanning direction, said powers being different from each other.

8. The color image forming apparatus according to claim 1, wherein said refraction section comprises a plastic toric lens having a power in the main scanning direction and a power in the sub-scanning direction, said powers being different from each other.

9. The color image forming apparatus according to claim 1, wherein a slant of a scanning line on a surface of said image carrying member is adjusted by rotating said diffracting optical element within a plane normal to the optical axis.

10. The color image forming apparatus according to claim 1, wherein said light source means comprises a semiconductor laser and wherein said optical means comprises a first optical element for converting the light emitted from the light source means into a substantially parallel beam, a second optical element for focusing the substantially parallel beam thus converted, into a line image longitudinal in the main scanning direction on a deflection surface of said deflecting element, and a third optical element comprising a refraction section having at least one refracting optical element and a diffraction section having at least one diffracting optical element for focusing a beam deflected by the deflecting element, in a spot shape on a surface of the image carrying member.

11. A scanning optical device comprising:

light source means;

a deflecting element for deflecting light emitted from said light source means;

optical means for guiding the light emitted from said light source means onto a surface to be scanned, said optical means comprising a refraction section having at least one refracting optical element and a diffraction section having at least one diffracting optical element; and means for displacing said diffracting optical element.

12. The scanning optical device according to claim 11, wherein said diffracting optical element is constructed as a separate unit from the other optical elements forming said scanning optical device.

13. The scanning optical device according to claim 11, wherein a direction of displacement of said diffracting optical element is a direction of rotation about the optical axis or a direction of rotation about an axis along the longitudinal direction of the diffracting optical element, and wherein said diffracting optical element is arranged to be rotatable independently in each of these directions.

14. The scanning optical device according to claim 11, wherein a slant of a scanning line on said surface to be scanned is adjusted by rotating said diffracting optical element about the optical axis.

15. The scanning optical device according to claim 11, wherein a curve of a scanning line on said surface to be scanned is adjusted by rotating said diffracting optical element about an axis along the longitudinal direction of the diffracting optical element.

16. The scanning optical device according to claim 11, wherein said diffracting optical element has a power in the main scanning direction and a power in the sub-scanning direction, said powers being different from each other.

17. The scanning optical device according to claim 11, wherein said refraction section comprises a plastic toric lens having a power in the main scanning direction and a power in the sub-scanning direction, said powers being different from each other.

18. The scanning optical device according to claim 11, wherein a slant of a scanning line on said surface to be scanned is adjusted by rotating said diffracting optical element within a plane normal to the optical axis.

19. The scanning optical device according to claim 11, wherein said light source means comprises a semiconductor laser and wherein said optical means comprises a first optical element for converting the light emitted from the light source means into a substantially parallel beam, a second optical element for focusing the substantially parallel beam thus converted, into a line image longitudinal in the main scanning direction on a deflection surface of said deflecting element, and a third optical element comprising a refraction section having at least one refracting optical element and a diffraction section having at least one diffracting optical element for focusing a beam deflected by the deflecting element, in a spot shape on said surface to be scanned.

20. A color image forming apparatus comprising:

light source means;

a deflecting element for deflecting light emitted from said light source means;

optical means for guiding the light emitted from said light source means onto a surface to be scanned, said optical means comprising a refraction section having at least one refracting optical element and a diffraction section having at least one diffracting optical element;

a scanning optical device comprising said light source means, said deflecting element, and said optical means, said color image forming apparatus comprising a plurality of such scanning optical devices;

an image carrying member disposed on said surface to be scanned, a plurality of such image carrying members being provided corresponding to said scanning optical devices; and means for displacing said refraction section or/and said diffraction section in the main scanning direction.

21. The color image forming apparatus according to claim 20, wherein said diffracting optical element is constructed as a separate unit from the other optical elements forming said scanning optical device.

22. The color image forming apparatus according to claim 20, wherein each unit of said refraction section or a scanning section comprising the refraction section and the deflecting element and said diffraction section is fixed to a sheet metal stay.

23. The color image forming apparatus according to claim 20, wherein a direction of displacement in the main scanning direction of said refraction section or a scanning section comprising the refraction section and the deflecting element and said diffraction section is a direction parallel to the main scanning direction or a direction of rotation about the optical axis within a plane including the main scanning direction.

24. The color image forming apparatus according to claim 20, wherein said diffracting optical element has a power in the main scanning direction and a power in the sub-scanning direction, said powers being different from each other.

25. The color image forming apparatus according to claim 20, wherein said refraction section comprises a plastic toric lens having a power in the main scanning direction and a power in the sub-scanning direction, said powers being different from each other.

26. The color image forming apparatus according to claim 20, wherein said light source means comprises a semiconductor laser and wherein said optical means comprises a first optical element for converting the light emitted from the light source means into a substantially parallel beam, a second optical element for focusing the substantially parallel beam thus converted, into a line image longitudinal in the main scanning direction on a deflection surface of said deflecting element, and a third optical element comprising a refraction section having at least one refracting optical element and a diffraction section having at least one diffracting optical element for focusing a beam deflected by the deflecting element, in a spot shape on a surface of the image carrying member.

27. A scanning optical device comprising:

light source means;

a deflecting element for deflecting light emitted from said light source means;

optical means for guiding the light emitted from said light source means onto a surface to be scanned, said optical means comprising a refraction section having at least one refracting optical element and a diffraction section having at least one diffracting optical element; and means for displacing said refraction section or/and said diffraction section in the main scanning direction.

28. The scanning optical device according to claim 27, wherein said diffracting optical element is constructed as a separate unit from the other optical elements forming said scanning optical device.

29. The scanning optical device according to claim 27, wherein each unit of said refraction section or a scanning section comprising the refraction section and the deflecting element and said diffraction section is fixed to a sheet metal stay.

30. The scanning optical device according to claim 27, wherein a direction of displacement in the main scanning direction of said refraction section or a scanning section comprising the refraction section and the deflecting element and said diffraction section is a direction parallel to the main scanning direction or a direction of rotation about the optical axis within a plane including the main scanning direction.

31. The scanning optical device according to claim 27, wherein said diffracting optical element has a power in the main scanning direction and a power in the sub-scanning direction, said powers being different from each other.

32. The scanning optical device according to claim 27, wherein said refraction section comprises a plastic toric lens having a power in the main scanning direction and a power in the sub-scanning direction, said powers being different from each other.

33. The scanning optical device according to claim 27, wherein said light source means comprises a semiconductor laser and wherein said optical means comprises a first optical element for converting the light emitted from the light source means into a substantially parallel beam, a second optical element for focusing the substantially parallel beam thus converted, into a line image longitudinal in the main scanning direction on a deflection surface of said deflecting element, and a third optical element comprising a refraction section having at least one refracting optical element and a diffraction section having at least one diffracting optical element for focusing a beam deflected by the deflecting element, in a spot shape on said surface to be scanned.

* * * * *

UNITED STATES PATENT AND TRADEMARK OFFICE
CERTIFICATE OF CORRECTION

PATENT NO.    : 6,452,687 B1
DATED         : September 17, 2002
INVENTOR(S)   : Suzuki et al.

It is certified that error appears in the above-identified patent and that said Letters Patent is hereby corrected as shown below:

Column 1,
Line 58, "each" should read -- each denote --.

Column 14,
Line 31, "as, follows." should read -- as follows: --.

Column 16,
Lines 44 and 49, "the both" should read -- both the --.

Column 19,
Line 64, "the both" should read -- both the --.

Signed and Sealed this

Twenty-second Day of April, 2003

JAMES E. ROGAN
*Director of the United States Patent and Trademark Office*